United States Patent
Takeda et al.

(10) Patent No.: US 11,924,139 B2
(45) Date of Patent: Mar. 5, 2024

(54) HYBRID AUTOMATIC REPEAT REQUEST-ACKNOWLEDGEMENT CODEBOOK GENERATION AND UPLINK TRANSMISSION

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Shaozhen Guo, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 511 days.

(21) Appl. No.: 17/264,598

(22) PCT Filed: Jul. 30, 2018

(86) PCT No.: PCT/JP2018/028427
§ 371 (c)(1),
(2) Date: Jan. 29, 2021

(87) PCT Pub. No.: WO2020/026295
PCT Pub. Date: Feb. 6, 2020

(65) Prior Publication Data
US 2021/0226759 A1   Jul. 22, 2021

(51) Int. Cl.
*H04L 5/00* (2006.01)
*H04L 1/1867* (2023.01)
(Continued)

(52) U.S. Cl.
CPC .......... *H04L 5/0055* (2013.01); *H04L 1/1887* (2013.01); *H04L 5/1469* (2013.01); *H04W 72/23* (2023.01)

(58) Field of Classification Search
CPC ... H04L 5/0055; H04L 1/1887; H04L 5/1469; H04L 1/0026; H04L 1/0027;
(Continued)

(56) References Cited

U.S. PATENT DOCUMENTS

| 2016/0219618 A1* | 7/2016 | Rico Alvarino | ...... H04W 72/21 |
| 2017/0201994 A1* | 7/2017 | Lim | ...... H04L 5/0055 |

(Continued)

FOREIGN PATENT DOCUMENTS

| JP | 2012-506671 A | 3/2012 |
| JP | 2013-507067 A | 2/2013 |

OTHER PUBLICATIONS

WO 2017/171299 A1 (Year: 2017).*
(Continued)

*Primary Examiner* — Rushil P. Sampat
(74) *Attorney, Agent, or Firm* — Osha Bergman Watanabe & Burton LLP

(57) ABSTRACT

In order to properly transmit UCI, even when PUCCH repetition transmission is used in future radio communication systems, a user terminal according to one aspect of the present disclosure includes a control section that determines a codebook for physical uplink control channel (PUCCH) transmission per slot, based on at least one of physical downlink shared channel (PDSCH) candidate occasions, a timing of hybrid automatic repeat request acknowledgement (HARQ-ACK) transmission corresponding to a received PDSCH and a PUCCH repetition factor, when PUCCH repetition transmission and a semi-static HARQ-ACK codebook are configured; and a transmitting section that transmits HARQ-ACK based on the codebook by applying the PUCCH repetition transmission.

6 Claims, 17 Drawing Sheets

(51) Int. Cl.
*H04L 5/14* (2006.01)
*H04W 72/23* (2023.01)

(58) Field of Classification Search
CPC ... H04L 1/0031; H04L 1/1671; H04L 5/0053; H04L 1/16; H04W 72/23; H04W 72/1294; H04W 72/1284; H04W 72/21
See application file for complete search history.

(56) References Cited

U.S. PATENT DOCUMENTS

| | | | |
|---|---|---|---|
| 2019/0037586 A1* | 1/2019 | Park | H04L 5/00 |
| 2019/0109677 A1* | 4/2019 | Wang | H04L 5/1469 |
| 2020/0296720 A1 | 9/2020 | Bala et al. | |
| 2021/0029694 A1 | 1/2021 | Nayeb Nazar et al. | |

OTHER PUBLICATIONS

Decision of Refusal issued in Japanese Application No. 2020-533897 dated Oct. 25, 2022 (6 pages).
NTT DOCOMO, Inc., "On HARQ-ACK feedback", 3GPP TSG RAN WG1 Meeting #93, R1-1807067, Busan, Korea, May 21-25, 2018 (11 pages).
3GPP TS 36.213 V13.8.0; "3rd Generation Partnership Project; Technical Specification Group Radio Access Network; Evolved Universal Terrestrial Radio Access (E-UTRA); Physical layer procedures (Release 13)"; Dec. 2017 (392 pages).
International Search Report for corresponding International Application No. PCT/JP2018/028427, dated Oct. 9, 2018 (5 pages).
Written Opinion for corresponding International Application No. PCT/JP2018/028427, dated Oct. 9, 2018 (5 pages).
3GPP TS 38.213 V15.2.0; "3rd Generation Partnership Project; Technical Specification Group Radio Access Network; NR; Physical layer procedures for control (Release 15)"; Jun. 2018 (17 pages).
Notice of Reasons for Refusal issued in Japanese Application No. 2020-533897 dated Aug. 2, 2022 (10 pages).
3GPP TSG RAN WG1 Meeting #93; R1-1807399 "Remaining Issues on CA" Qualcomm Incorporated; Busan, Korea; May 21-25, 2018 (6 pages).
3GPP TSG RAN WG1 Meeting #81; R1-152807 "UCI transmission for Rel-13 low complexity UEs and UEs in enhanced coverage" CATT; Fukuoka, Japan; May 25-29, 2015 (4 pages).
Extended European Search Report issued in European Application No. 18928914.3, dated Feb. 18, 2022 (9 pages).
Office Action issued in the counterpart Chinese Patent Application No. 201880098212.4, dated Jun. 15, 2023 (16 pages).

* cited by examiner

HYBRID AUTOMATIC REPEAT REQUEST-ACKNOWLEDGEMENT CODEBOOK GENERATION AND UPLINK TRANSMISSION

TECHNICAL FIELD

The present invention relates to a user terminal and a radio communication method in next-generation mobile communication systems.

BACKGROUND ART

In existing LTE systems (for example, Rel. 8 to 13), a user terminal (User Equipment (UE)) transmits uplink control information (UCI) by using at least one of an uplink (UL) data channel (for example, Physical Uplink Shared Channel (PUSCH)) and a UL control channel (for example, Physical Uplink Control Channel (PUCCH)).

For example, the UCI may include Retransmission Control Information (Hybrid Automatic Repeat Request Acknowledgement (HARQ-ACK)), Scheduling Request (SR), Channel State Information (CSI), and the like for Physical Downlink Shared Channel (PDSCH) (Non Patent Literature 1). The HARQ-ACK may be called negative-acknowledgement (ACK/NACK), A/N, or the like.

CITATION LIST

Non Patent Literature

Non Patent Literature 1: 3GPP TS 36.213 V13.8.0 "Evolved Universal Terrestrial Radio Access (E-UTRA); Physical layer procedures (Release 13)", December 2017

SUMMARY OF INVENTION

Technical Problem

In the existing LTE system, it is possible to apply a repetition transmission of HARQ-ACK using PUCCH only to a user terminal to which one serving cell is configured. Even if the HARQ-ACK repetition transmission is configured to be enabled, some restrictions need to be met for HARQ-ACK repetition transmission.

In future radio communication systems (for example, New Radio (NR)), the use of PUCCH repetition transmission is being considered. However, the restrictions of the existing LTE systems for PUCCH repetition transmission in the future radio communication systems (for example, NR) have not yet been considered in detail. In addition, whether or not the HARQ-ACK repetition transmissions for separate PDSCHs are expected to be duplicated in one slot has not yet been investigated. Unless the behavior of the user terminal is clarified regarding these contents, HARQ-ACK transmission cannot be performed properly, and communication throughput, frequency utilization efficiency, and the like may deteriorate.

The present invention has been made in view of the above, it is therefore an object of the present invention to provide a user terminal and a radio communication method that can appropriately transmit UCI even when a PUCCH repetition transmission is used in a future radio communication system.

Solution to Problem

In accordance with one aspect of the present invention, a user terminal includes a control section that determines a codebook for physical uplink control channel (PUCCH) transmission per slot, based on at least one of physical downlink shared channel (PDSCH) candidate occasions, a timing of hybrid automatic repeat request acknowledgement (HARQ-ACK) transmission corresponding to a received PDSCH, and a PUCCH repetition factor, when PUCCH repetition transmission and a semi-static HARQ-ACK codebook are configured; and a transmitting section that transmits HARQ-ACK based on the codebook by applying the PUCCH repetition transmission.

Advantageous Effects of Invention

According to the present invention, the UCI can be appropriately transmitted even when the PUCCH repetition transmission is used in the future radio communication system.

DESCRIPTION OF EMBODIMENTS (HARQ-ACK Repetition Transmission in Existing LTE System)

In the existing LTE system, it is possible to apply a repetition transmission of HARQ-ACK using PUCCH only to a user terminal to which one serving cell is configured. The one serving cell may be either a frequency division duplex (FDD) cell or a time division duplex (TDD) cell. If the one serving cell is the TDD cell, HARQ-ACK bundling is required for HARQ-ACK repetition transmission.

In the present disclosure, HARQ-ACK repetition transmission, HARQ-ACK repetition, A/N repetition, UCI repetition, PUCCH repetition, repetition, repetition transmission, and the like may be replaced with one another.

The HARQ-ACK repetition transmission can be configured in the user terminal by using higher layer signaling, for example, "ackNackRepetition" which is a radio resource control (RRC) parameter. The RRC parameter includes a repetition factor. 2, 4, 6, and the like can be configured as the repetition factor.

In the present disclosure, the repetition factor and the repetition number may be replaced with one another.

Even when the HARQ-ACK repetition transmission is configured to be enabled, there are the following restrictions for HARQ-ACK repetition transmission.

The user terminal does not repeat HARQ-ACK transmission corresponding to PDSCH transmission from a subframe $(n-N_{ANRep}-3)$ to a subframe $(n-5)$ in a subframe n. Here, $N_{ANRep}$ corresponds to the repetition factor.

The user terminal transmits only a HARQ-ACK response corresponding to a PDSCH detected in a subframe $(n-4)$ from the subframe n to a subframe $(n+N_{ANRep}-1)$.

The user terminal does not transmit other signals or channels from the subframe n to the subframe $(n+N_{ANRep}-1)$.

The user terminal does not repeatedly transmit a HARQ-ACK response corresponding to a PDSCH transmission detected in a subframe $(n+N_{ANRep}-5)$ from a subframe $(n-3)$.

Figure 1:
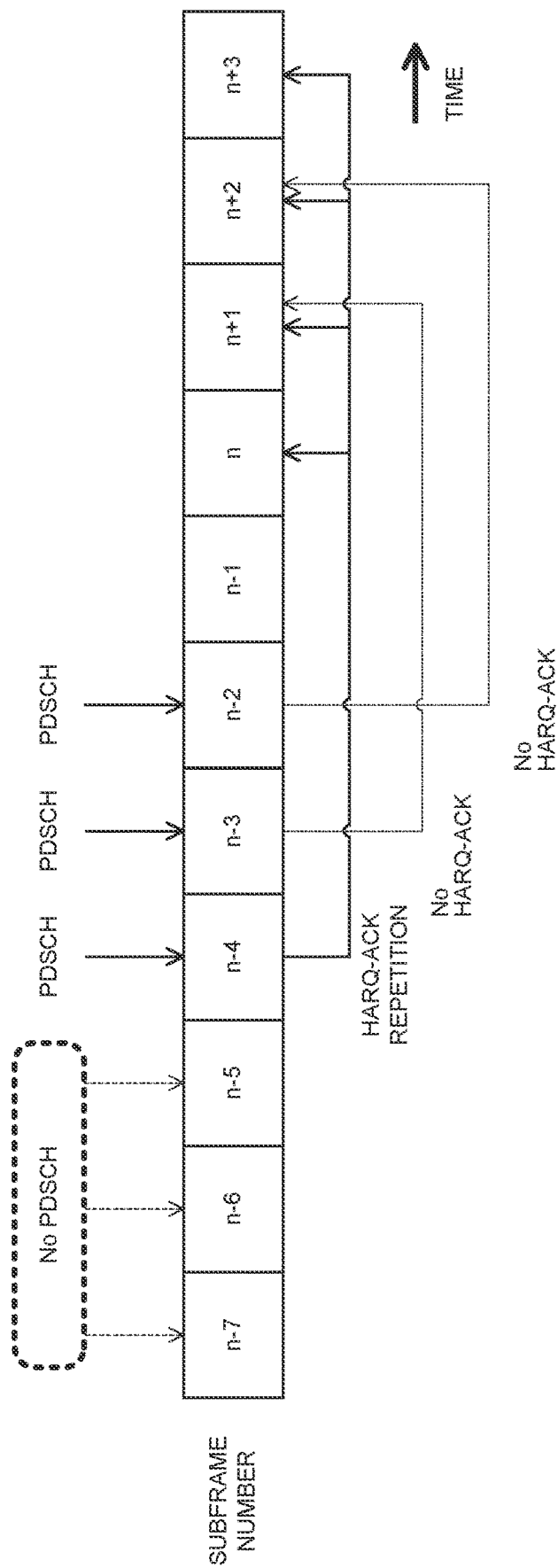
FIG. 1 is a diagram illustrating a concept of restrictions on HARQ-ACK repetition transmission in LTE.

FIG. 1 is a diagram illustrating a concept of restrictions on HARQ-ACK repetition transmission in an existing LTE system. In the example shown in FIG. 1, PDSCH is not detected from a subframe $(n-7)$ to a subframe $(n-5)$, and it is assumed that PDSCH for the user terminal is detected from a subframe $(n-4)$ to a subframe $(n-2)$. In the example shown in FIG. 1, $N_{ANRep}$ which corresponds to the repetition factor is 4.

In FIG. 1, since PDSCH was not detected from the subframe $(n-7)$ to the subframe $(n-5)$, the user terminal does not repeat the HARQ-ACK transmission corresponding to the PDSCH transmission from the subframe $(n-7)$ to the subframe $(n-5)$ in the subframe n.

The user terminal repeatedly transmits only the HARQ-ACK corresponding to the PDSCH detected in the subframe $(n-4)$ from the subframe n in a subframe $(n+3)$.

The user terminal cannot transmit other signals or channels from the subframe n to the subframe $(n+3)$. The user terminal cannot repeatedly transmit a HARQ-ACK response corresponding to the PDSCH transmission detected in the subframe $(n-1)$ from the subframe $(n-3)$.

(HARQ-ACK Codebook)

In future radio communication systems (for example, NR), it is being considered that the user terminal determines a HARQ-ACK codebook (which may be called a HARQ-ACK size) to be semi-static or dynamic. A base station may notify the user terminal of information indicating a determination method of the HARQ-ACK codebook, for example, information indicating whether the HARQ-ACK codebook is semi-static or dynamic for each component carrier, each cell group (CG), each PUCCH group, or each user terminal by higher layer signaling.

The HARQ-ACK codebook may be replaced with a HARQ-ACK codebook of PDSCH, a HARQ-ACK codebook size, a HARQ-ACK bit number, and the like.

In the present disclosure, the higher layer signaling may be, for example, any of RRC signaling, medium access control (MAC) signaling, and broadcast information, or a combination thereof.

For the MAC signaling, for example, a MAC control element (MAC CE), a MAC protocol data unit (PDU), or the like may be used. The broadcast information may be, for example, a master information block (MIB), a system information block (SIB), a minimum system information (remaining minimum system information (RMSI)), other system information (OSI), or the like.

The user terminal may determine (generate) the HARQ-ACK information bit based on the determined HARQ-ACK codebook for each component carrier, each cell group, each PUCCH group, or each user terminal, and may transmit the generated HARQ-ACK using at least one of the uplink control channel (PUCCH) and the uplink shared channel (PUSCH).

When the user terminal is configured to semi-statically determine the HARQ-ACK codebook, or configures a semi-static HARQ-ACK codebook, the determination of the HARQ-ACK codebook may be referred to as a type 1 HARQ-ACK codebook determination. When the user terminal is configured to dynamically determine the HARQ-ACK codebook, or configures a dynamic HARQ-ACK codebook, the determination of the HARQ-ACK codebook may be referred to as a type 2 HARQ-ACK codebook determination.

The type 1 HARQ-ACK codebook and the semi-static HARQ-ACK codebook may be replaced with one another. The type 2 HARQ-ACK codebook and the dynamic HARQ-ACK codebook may be replaced with one another.

In the type 1 HARQ-ACK codebook determination, the user terminal may determine the number of HARQ-ACK bits and the like based on a structure configured by the higher layer signaling. The configured structure may include, for example, downlink (DL) transmission scheduled over a range associated with HARQ-ACK feedback timing, for example, the maximum or minimum number of PDSCHs.

The range is also referred to as a HARQ-ACK bundling window, a HARQ-ACK feedback window, a bundling window, a feedback window, and the like. The bundling window may correspond to a range of at least one of space, time, and frequency.

In the type 2 HARQ-ACK codebook determination, the user terminal may determine the number of HARQ-ACK bits based on downlink control information, for example, a bit string of a downlink assignment index (DAI) field included in a DL assignment.

The DAI field may indicate at least one of a total DAI and a counter DAI.

The total DAI is information about the total number of scheduled DL data (PDSCH), and may correspond to the total number of bits or the codebook size of HARQ-ACK fed back by the user terminal.

The counter DAI is information about an accumulated value of the scheduled DL data (PDSCH). For example, the downlink control information (DCI) of one or more component carriers detected within a time unit, for example, a slot or a subframe may include counter DAIs numbered in order of a component carrier index. When the HARQ-ACKs for PDSCHs scheduled over a plurality of time units are collected and fed back, for example, when the bundling window is configured with a plurality of slots, the counter DAI may be applied over the plurality of time units.

(PDSCH-to-ACK Timing)

In the future radio communication systems (for example, NR), the user terminal determines a transmission timing of the HARQ-ACK corresponding to the received PDSCH based on the DCI that schedules the PDSCH. The timing may be called PDSCH-to-ACK timing, K1, or the like. The DCI may be referred to as DL DCI, DL assignment, DCI format 1_0, DCI format 1_1, or the like.

For example, when the DCI format 1_0 is detected, the user terminal transmits the HARQ-ACK corresponding to the PDSCH in the slot (n+k) (for example, k is an integer from 1 to 8) with reference to the slot n including a final symbol of the PDSCH, based on a PDSCH-to-HARQ-timing-indicator field of the HARQ corresponding to the PDSCH included in the DCI.

When the DCI format 1_1 is detected, the user terminal transmits the HARQ-ACK corresponding to the PDSCH in the slot (n+k) (for example, k is an integer from 1 to 8) with reference to the slot n including a final symbol of the PDSCH, based on a PDSCH-to-HARQ-timing-indicator field of the HARQ corresponding to the PDSCH included in the DCI. Here, a correspondence between k and the timing indicator field may be configured in the user terminal for each PUCCH, PUCCH group, or cell group by the higher layer signaling.

For example, the correspondence may be configured by a parameter included in the PUCCH Config information element of RRC signaling. The parameter may be called dl-DataToUL-ACK, Slot-timing-value-K1, or the like. For example, the K1 may set a plurality of candidate values for PDSCH-to-ACK timing indicator by the higher layer signaling, and the DCI for scheduling the PDSCH may indicate one of the plurality of candidate values.

The K1 may be configured for each PUCCH group or cell group. The K1 may be a time determined based on a channel on which the HARQ-ACK is transmitted, for example, PUCCH or PUSCH's numerology (for example, subcarrier spacing).

(Repetition Transmission of HARQ-ACK in NR)

In the future radio communication systems (for example, NR), PUCCH repetition transmission can be configured by higher layer signaling for PUCCH formats 1, 3, and 4 with a transmission period of 4 symbols or more. The repetition factors may be configured in common for all the PUCCH formats 1, 3, and 4.

The user terminal may repeatedly transmit the UCI transmitted by PUCCH in the first slot of the slot to be repeatedly transmitted in the remaining slots to be repeatedly transmitted. The number of symbols for PUCCH and a start symbol may be the same in each slot to which the repetition transmission is applied. The PUCCH repetition transmission may be performed in continuous slots or non-continuous slots.

However, the restrictions of the existing LTE systems for PUCCH repetition transmission in the future radio communication systems (for example, NR) have not yet been considered in detail. In addition, whether or not the HARQ-ACK repetition transmissions for separate PDSCHs are allowed (or expected) to be overlapped in one slot has not yet been investigated. Unless the behavior of the user terminal is clarified regarding these contents, HARQ-ACK transmission cannot be performed properly, and communication throughput, frequency utilization efficiency, and the like may deteriorate.

Therefore, the present inventors have conceived a configuration for appropriately transmitting the UCI, and an operation of the user terminal and the base station, even when the PUCCH repetition transmission is used in the future radio communication systems (for example, NR).

Hereinafter, embodiments according to the present disclosure will be described in detail with reference to the drawings. The radio communication method according to each of the embodiments may be applied independently, or may be applied in combination with others.

In the following embodiments, PUCCH and PUCCH repetition transmission may be replaced with one another.

(Radio Communication Method)

First Embodiment

In the first embodiment, restrictions on PUCCH repetition transmission will be described. Embodiment 1.1 corresponds to a case where there are no restrictions or relatively few restrictions on PUCCH repetition transmission. Embodiment 1.2 corresponds to a case where there are restrictions or relatively many restrictions on PUCCH repetition transmission.

Embodiment 1.1

In Embodiment 1.1, the PUCCH repetition transmission may be available for any UCI type. The PUCCH repetition transmission may be available in any of the cases where the UCI is periodically transmitted, the UCI is aperiodically transmitted, and transmitted with semi-persistent resources. The case where the UCI is transmitted periodically refers to, for example, a periodic CSI (P-CSI)) report. The case where the UCI is aperiodically transmitted refer to, for example, an aperiodic CSI (A-CSI)) report. The case transmitted with semi-persistent resources refer to, for example, a semi-persistent CSI (SP-CSI) report.

The UCI type may mean either HARQ-ACK, positive SR or negative SP, CSI including CSI Part 1 or CSI Part 2, or a combination thereof.

The CSI may include at least one of channel quality indicator (CQI), precoding matrix indicator (PMI), CSI-RS resource indicator (CRI), SS/PBCH block resource indicator (SSBRI), layer indicator (LI), rank indicator (RI), layer 1 reference signal received power (L1-RSRP), L1-RSRQ (Reference Signal Received Quality), L1-SINR (Signal to Interference plus Noise Ratio), L1-SNR (Signal to Noise Ratio), and the like.

The CSI Part 1 may include information with a relatively small number of bits, for example, RI and wideband CQI. The CSI Part 2 may include information with a relatively large number of bits such as information determined based on the CSI Part 1, for example, subband CQI and PMI.

When the PUCCH repetition transmission is configured in a certain control unit, the user terminal may repeatedly transmit the UCI (for example, either HARQ-ACK, SR, or CSI, or a combination thereof) by PUCCH for one or a plurality of (for example, all) component carriers (CC) within the control unit.

In the present disclosure, the control unit may be, for example, either a component carrier (CC), a CC group, a cell group, a PUCCH group, a MAC entity, a frequency range (FR), a band, or a bandwidth part (BWP), or a combination thereof. The control unit may be simply called a group.

The user terminal may assume that a plurality of PUCCH repetition transmissions do not overlap in one slot when the PUCCH repetition transmission is configured. For example, when the PUCCH repetition transmission is configured, the user terminal may not expect DL semi-persistent scheduling (SPS), SR, P-CSI reporting, and SP-CSI reporting having a period shorter than the duration of the PUCCH repetition transmission to be configured. The duration of PUCCH repetition transmission may be a slot for the repetition factor.

Figure 2:
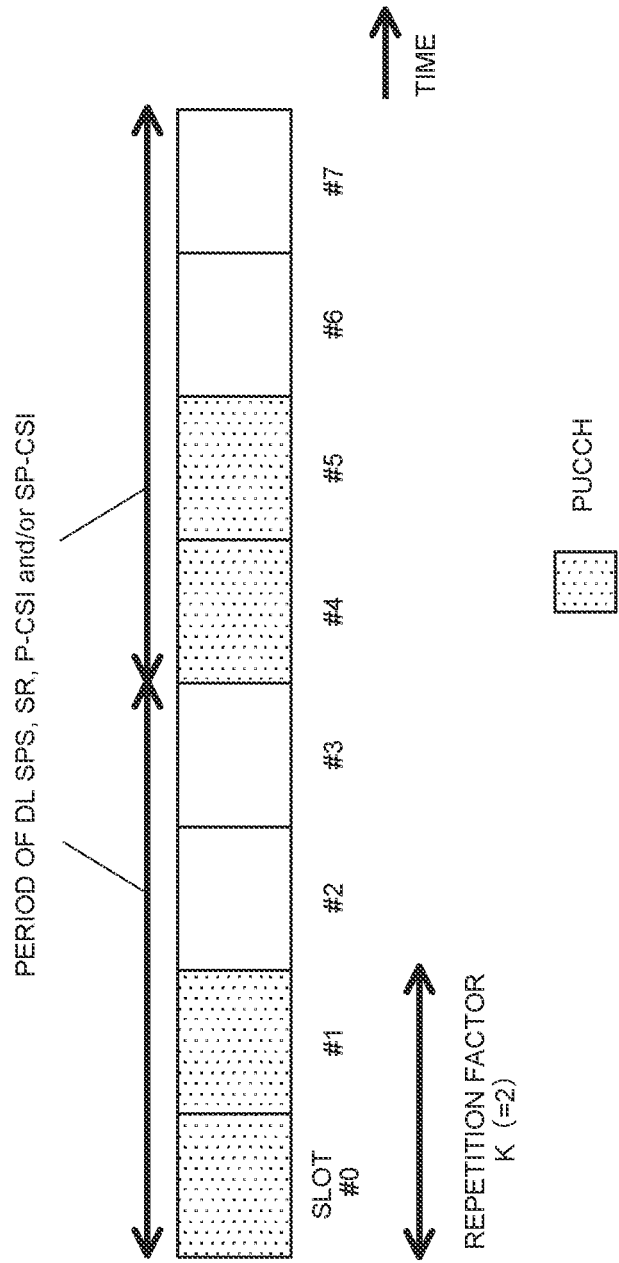
FIG. 2 is a diagram showing an example of a case where it is assumed that PUCCH repetition transmissions do not overlap in one slot in a first embodiment.

FIG. 2 is a diagram showing an example of a case where it is assumed that PUCCH repetition transmissions do not overlap in one slot in the first embodiment. In the example shown in FIG. 2, the user terminal is configured to repeat PUCCH transmission of 2 slots, that is, the repetition factor K=2. In this case, the user terminal may assume that DL semi-persistent scheduling (SPS), SR, P-CSI reporting, and SP-CSI reporting having a period shorter than 2 slots are not configured. In the example shown in FIG. 2, for example, it is assumed that at least one period of DL semi-persistent scheduling (SPS), SR, P-CSI reporting, and SP-CSI reporting configured in the user terminal is 4 slots.

For example, when the user terminal transmits HARQ-ACK for DL semi-persistent scheduling (SPS) using PUCCH, since the slots used for PUCCH repetition transmission are a slot #4n and a slot #(4n+1) (n=0, 1, . . . ), the plurality of PUCCH repetition transmissions do not overlap in the same slot.

As the case in which the PUCCH repetition transmission is configured, when at least one of DL semi-persistent scheduling (SPS), SR, P-CSI reporting, and SP-CSI reporting having the period shorter than the duration of the PUCCH repetition transmission is configured, the user terminal may override a previous PUCCH repetition transmission with the latest PUCCH repetition transmission, which is different from the PUCCH repetition transmission.

Figure 3:
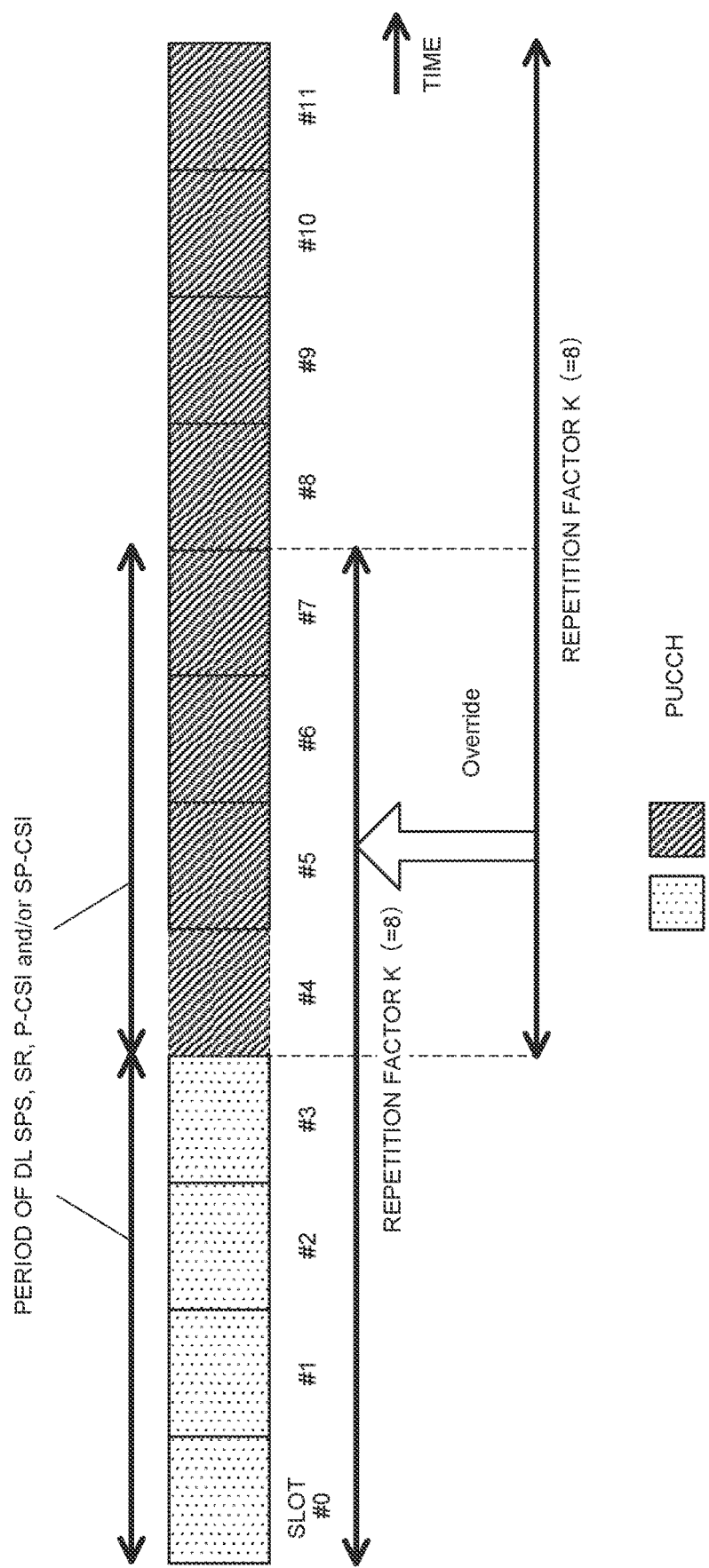
FIG. 3 is a diagram showing an example of a case where it is assumed that PUCCH repetition transmissions do not overlap in one slot in the first embodiment.

FIG. 3 is a diagram showing an example of a case where it is assumed that PUCCH repetition transmissions do not overlap in one slot in the first embodiment. In the example shown in FIG. 3, the user terminal is configured to repeat PUCCH transmission of 8 slots, that is, the repetition factor K=8. It is assumed that at least one period of DL semi-persistent scheduling (SPS), SR, P-CSI reporting, and SP-CSI reporting configured in the user terminal is 4 slots.

In the example shown in FIG. 3, a first PUCCH repetition transmission starting from a slot #0 (PUCCH repetition transmission from a slot #0 to a slot #7) partially overlaps with a second PUCCH repetition transmission starting from a slot #4 (PUCCH repetition transmission from a slot #4 to a slot #11). The user terminal may transmit the second PUCCH repetition transmission, which is the latest PUCCH repetition transmission, in the slot #4 to the slot #7.

When the second PUCCH repetition transmission starts in the middle of the first PUCCH repetition transmission, the user terminal may interrupt the first PUCCH repetition transmission that has started the transmission earlier and override the latest second PUCCH repetition transmission.

The PUCCH repetition transmission may be used for one carrier or a plurality of carriers. The PUCCH repetition transmissions may be used with either FDD carriers or TDD carriers.

The PUCCH repetition transmission may be used for certain requirements, for example, any data type with delay or reliability. The data type may be identified by, for example, radio network temporary identifier (RNTI) in which cyclic redundancy check (CRC) of data is masked, or by bearer or quality of service class identifier (QCI) of data.

Embodiment 1.2

In embodiment 1.2, the PUCCH repetition transmission may be assumed to be used for at least one of HARQ-ACK and SR and not for other UCI types.

For example, the user terminal configured for PUCCH repetition transmission may transmit HARQ-ACK over K times of PUCCH repetition transmissions. In this case, the user terminal does not have to expect the HARQ-ACK of K times of PUCCH repetition transmissions to collide with other UCI types, such as SR or CSI.

If a transmission period of the other UCI type collides with the HARQ-ACK of K times of PUCCH repetition transmissions, the user terminal may drop the other UCI type or pend the transmission.

The user terminal configured for PUCCH repetition transmission may transmit at least one of HARQ-ACK and SR over K times of PUCCH repetition transmissions. In this case, the user terminal may assume that the SR period (SR occasion) can only collide with a first repetition (first slot) of HARQ-ACK of the K times of PUCCH repetition transmissions.

The user terminal does not have to expect the K times of PUCCH repetition transmissions to collide with other UCI types such as CSI. If the transmission period of the other UCI type such as CSI collides with HARQ-ACK of the K times of PUCCH repetition transmissions, the user terminal may drop the other UCI type or pend the transmission.

PUCCH repetition transmission may be used only in at least one condition such as non-carrier aggregation with no carrier aggregation configured on the user terminal, carrier aggregation up to X (for example, X=2) component carriers, FDD only, FDD and TDD with a specific UL-DL configuration (for example, UL/DL ratio is in a certain range (0.4 or more), non-code block group retransmission, with PUCCH or both PUCCH and PUSCH HARQ-ACK bundling, or at least without PUCCH HARQ-ACK bundling.

According to the first embodiment, the conditions or restrictions to which the PUCCH repetition transmission is applied can be appropriately configured in the user terminal. The user terminal can process the PUCCH repetition transmission based on an appropriate assumption.

Second Embodiment

In the second embodiment, the user terminal configured for PUCCH repetition transmission may not expect a PDSCH schedule in which HARQ-ACKs for different PDSCHs in one or more slots partially overlap in one control unit, for example, a serving cell in a cell group or a PUCCH group. The user terminal may assume that a scheduler of the base station enforces such restrictions on the PDSCH schedule.

After the user terminal determines a PUCCH resource for repetition transmission in one control unit, for example, the cell group or the PUCCH group, the user terminal may discard or ignore the PDCCH (DCI) that schedules a PDSCH to overlap the plurality of PUCCH repetition transmissions in one or more slots in a serving cell within the same control unit.

After the user terminal determines the PUCCH resource for repetition transmission in one control unit, the user terminal may assume that the PDSCH is not scheduled to overlap the plurality of PUCCH repetition transmissions in one or more slots in a serving cell within the same control unit.

Figure 4:
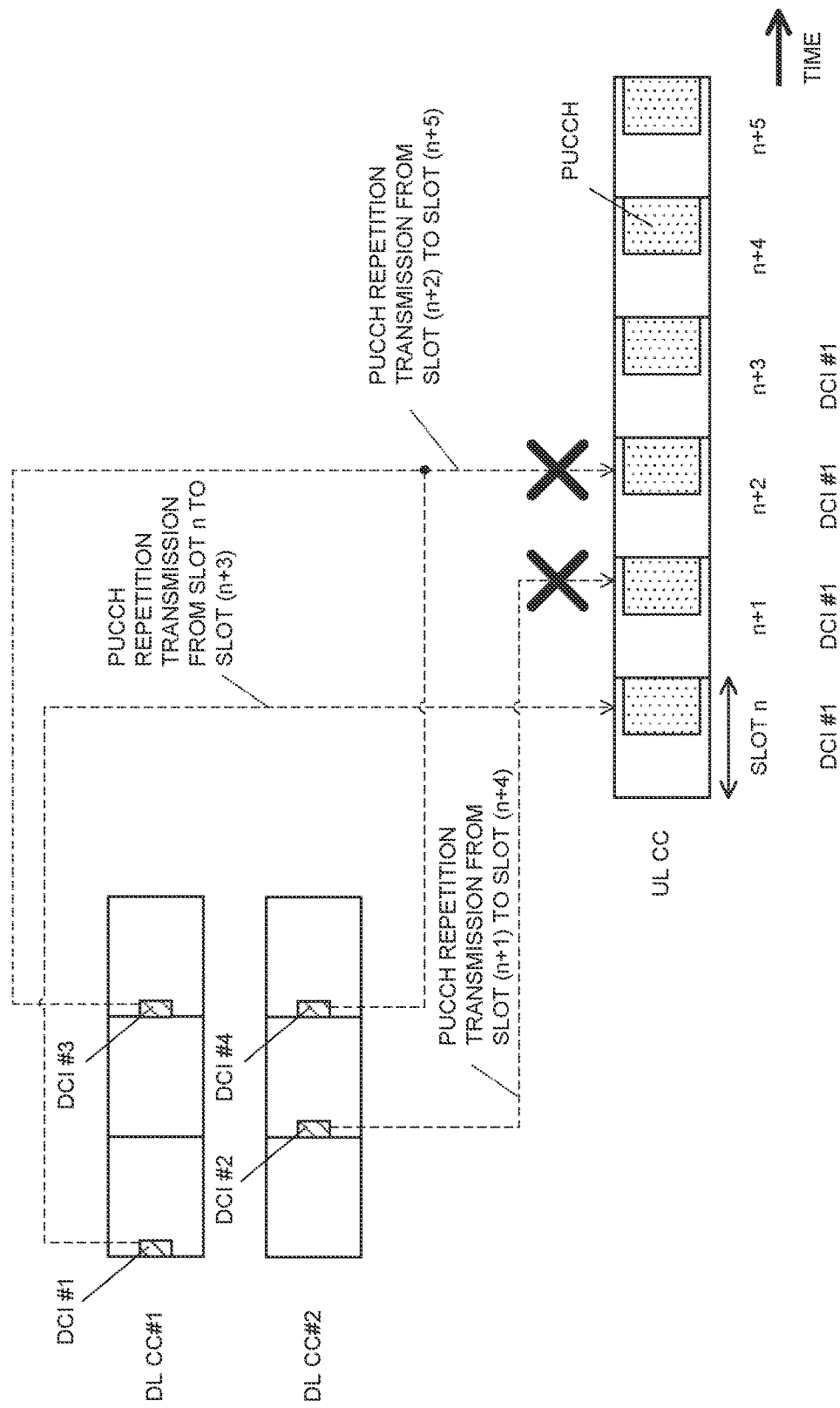
FIG. 4 is a diagram showing an example of PUCCH repetition transmission in a second embodiment.

FIG. 4 is a diagram showing an example of PUCCH repetition transmission in the second embodiment. In the example shown in FIG. 4, it is assumed that a control unit (for example, cell group, PUCCH group) including two DL component carriers (DL CC #1 and DL CC #2) is configured, and HARQ-ACK is repeatedly transmitted by PUCCH in a given UL component carrier (UL CC) according to PDSCH in the DL component carriers. At least two component carriers of the DL CC #1, the DL CC #2, and the UL CC may be included in the same component carrier.

The user terminal receives DCI #1 and DCI #3 on DL CC #1. The user terminal receives DCI #2 and DCI #4 on DL CC #2. The user terminal detects DCI #1 in one slot, detects DCI #2 in the next slot, and detects DCI #3 and DCI #4 in the next slot.

Both DCI #1 to DCI #4 may be DCIs that schedule PDSCH. It is assumed that the user terminal configures K=4 as a value of the repetition factor K of the PUCCH repetition transmission.

The DCI #1 indicates PUCCH repetition transmission from a slot n to a slot (n+3) of UL CC. For example, the DCI #1 may indicate that the transmission timing of HARQ-ACK to PDSCH scheduled by the DCI #1 starts from the slot n.

The DCI #2 indicates PUCCH repetition transmission from a slot (n+1) to a slot (n+4) of UL CC. The DCI #3 and the DCI #4 indicate PUCCH repetition transmission from a slot (n+2) to a slot (n+5) of UL CC.

In the example shown in FIG. 4, the user terminal starts PUCCH repetition transmission from the slot n to the slot (n+3) based on the DCI #1. Since the PUCCH repetition transmission based on DCI #2 to DCI #4 overlaps with the PUCCH repetition transmission based on DCI #1, the user terminal discards DCI #2 to DCI #4.

According to the second embodiment, overlap of the PUCCH repetition transmission can be suppressed, and the complexity of processing on the user terminal can be suppressed.

Third Embodiment

In a third embodiment, a user terminal configured for PUCCH repetition transmission may schedule PDSCHs such that HARQ-ACKs for different PDSCHs in one or more slots partially overlap in one control unit, for example, a serving cell in a cell group or a PUCCH group.

In the third embodiment, it is assumed that the user terminal has a semi-static HARQ-ACK codebook configured for a given cell, cell group (CG), PUCCH group, and the like. When the semi-static HARQ-ACK codebook is configured, the user terminal transmits an ACK/NACK to PDSCH candidates that can be scheduled, except for a specific exception condition. Therefore, a DCI detection error by the user terminal does not affect the determination of the HARQ-ACK codebook. The specific exception condition is, for example, a case where partial band (BWP) switching occurs.

When the semi-static HARQ-ACK codebook is configured, the user terminal may generate a HARQ-ACK bit for each PDSCH candidate occasion and transmits the HARQ-ACK bit to the base station. The PDSCH candidate occasion is a PDSCH allocation candidate resource that the base station can schedule to the user terminal using DCI. The base station may notify the user terminal of a HARQ-ACK transmission timing K1 corresponding to each PDSCH candidate occasion by using DCI.

The user terminal determines (generates) the HARQ-ACK information bit for the HARQ-ACK transmission timing K1 that can be configured by DCI, except for specific exception conditions. When the PUCCH repetition transmission is configured, the user terminal determines (generates) the HARQ-ACK information bit to be transmitted by PUCCH or PUSCH of K slots after a given slot from PDSCH reception.

For the semi-static HARQ-ACK codebook, the user terminal may determine the codebook for each PUCCH transmission in each slot, based on at least one of (1) PDSCH candidate occasion identified from RRC, (2) a list of K1 values configured by RRC, and (3) the PUCCH repetition factor notified by RRC.

Figure 5:
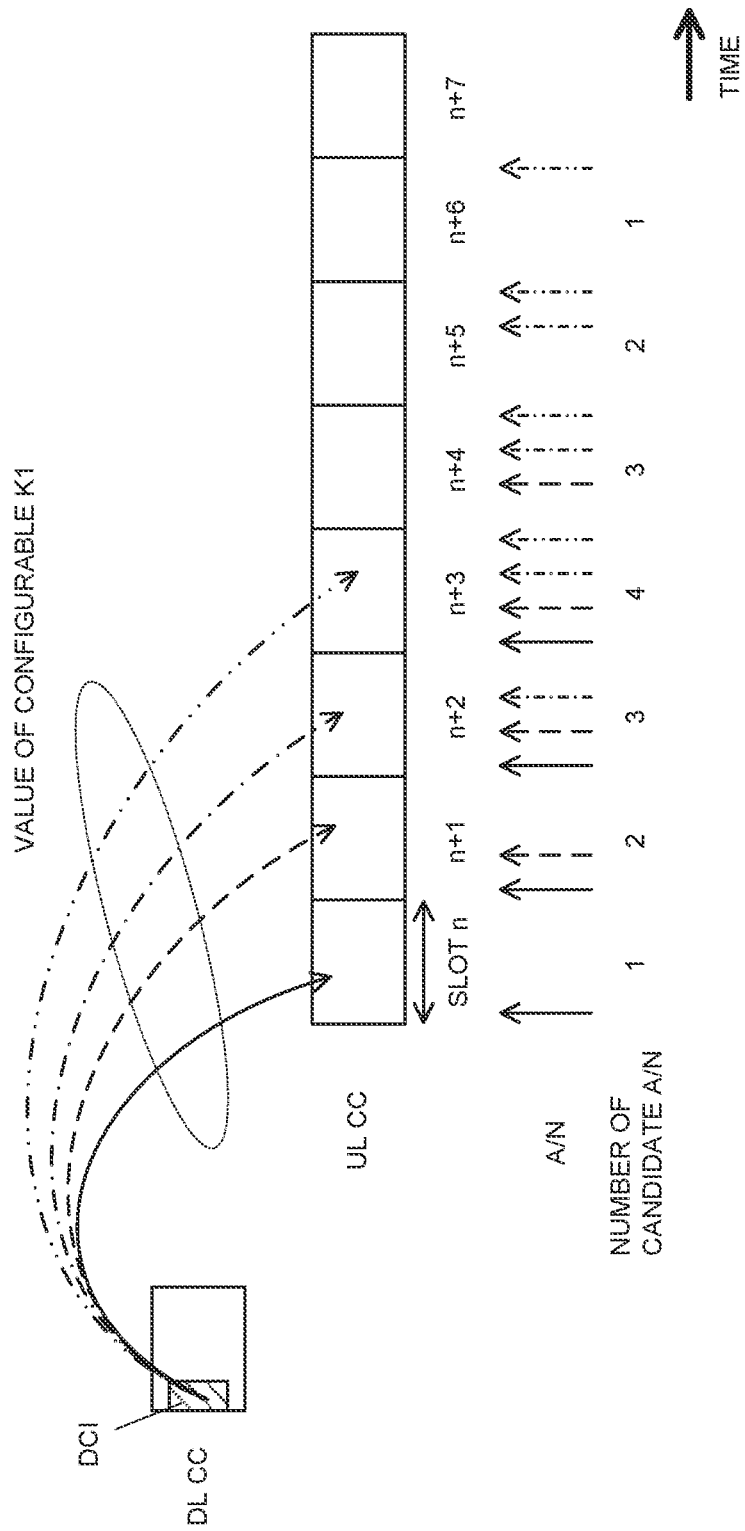
FIG. 5 is a diagram showing an example of a semi-static HARQ-ACK codebook determination according to a third embodiment.

FIG. 5 is a diagram showing an example of a semi-static HARQ-ACK codebook determination according to the third embodiment. In the example shown in FIG. 5, it is assumed that HARQ-ACK is repeatedly transmitted by PUCCH in a given UL component carrier (UL CC) according to PDSCH in a given DL component carrier (DL CC). It is assumed that the user terminal configures K=4 as a value of the repetition factor K of the PUCCH repetition transmission.

The user terminal receives DCI on the DL component carrier (DL CC). In FIG. 5, the value of the transmission timing K1 of all HARQ-ACKs for which the DCI can be configured is represented by four arrows. For example, if the DCI configures the value of the HARQ-ACK transmission timing K1 represented by a solid arrow, the HARQ-ACK transmission timing for the PDSCH scheduled by the DCI starts from a slot n.

Similarly, in FIG. 5, when the DCI configures the value of the HARQ-ACK transmission timing K1 represented by a dashed arrow, the HARQ-ACK transmission timing for the PDSCH scheduled by the DCI starts from a slot (n+1). If the DCI configures the value of the HARQ-ACK transmission timing K1 represented by an alternated long and short dash arrow, the HARQ-ACK transmission timing for the PDSCH scheduled by the DCI starts from a slot (n+2). If the DCI configures the value of the HARQ-ACK transmission timing K1 represented by the alternated long and two short dashes arrow, the HARQ-ACK transmission timing for PDSCH scheduled by the DCI starts from slot (n+3).

Therefore, in FIG. 5, the number of candidate A/Ns that may be transmitted in the slot n of the UL component carrier is 1 (solid arrow). The number of candidate A/Ns that can be transmitted in the slot (n+1) is 2 (solid arrow and dashed arrow). The number of candidate A/Ns that can be transmitted in the slot (n+2) is 3 (solid arrow, dashed arrow, and alternated long and short dash arrow). The number of candidate A/Ns that can be transmitted in the slot (n+3) is 4 (solid arrow, dashed arrow, alternated long and short dash arrow, and alternated long and two short dashes arrow). The number of candidate A/Ns that can be transmitted in the slot (n+4) is 3 (dashed arrow, alternated long and short dash arrow, and alternated long and two short dashes arrow). The number of candidate A/Ns that can be transmitted in the slot (n+5) is 2 (alternated long and short dash arrow, and alternated long and two short dashes arrow). The number of candidate A/Ns that can be transmitted in the slot (n+6) is 1 (alternated long and two short dashes arrow).

As shown in FIG. 5, the user terminal needs to generate four HARQ-ACK information bits in the slot (n+3), for example, regardless of which HARQ-ACK transmission timing K1 value is configured by DCI.

Figure 6:
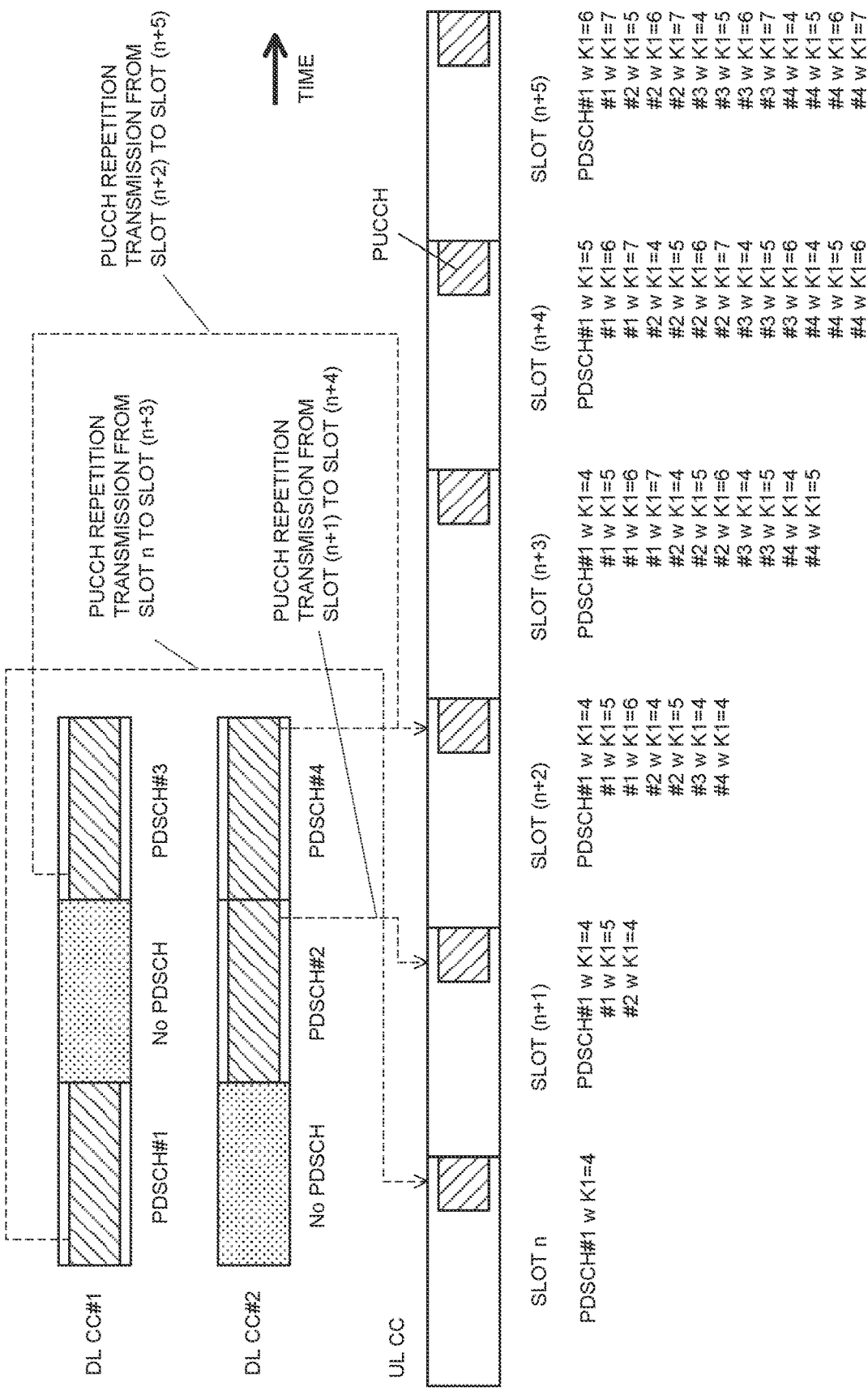
FIG. 6 is a diagram showing an example of a semi-static HARQ-ACK codebook configuration according to the third embodiment.

FIG. 6 is a diagram showing an example of a semi-static HARQ-ACK codebook configuration according to the third embodiment. In the example shown in FIG. 6, it is assumed that a codebook size or a PUCCH format is different per slot during PUCCH repetition transmission. The RRC makes such a configuration. It is assumed that the user terminal configures K=4 as a value of the repetition factor K of the PUCCH repetition transmission.

In the example shown in FIG. 6, it is assumed that a control unit (for example, cell group, PUCCH group) including two DL component carriers (DL CC #1 and DL CC #2) is configured, and HARQ-ACK is repeatedly transmitted by PUCCH in a given UL component carrier (UL CC) according to PDSCH in the DL component carriers. At least two component carriers of the DL CC #1, the DL CC #2, and the UL CC may be included in the same component carrier.

In DL CC #1 and DL CC #2, there are slots where PDSCH cannot be scheduled. For example, in a carrier that communicates using TDD, it is assumed that there are slots where DL resources are not configured and PDSCH cannot be scheduled.

The DCI that schedules PDSCH #1 configures the HARQ-ACK transmission timing K1 for the PDSCH #1.

If K1=4 is configured by the DCI that schedules the PDSCH #1, the transmission of the A/N (PDSCH #1w (with) K1=4 in FIG. 6) can be configured in the PUCCH from the slot n to the slot (n+3).

When K1=5 is configured by the DCI that schedules the PDSCH #1, the transmission of the A/N (PDSCH #1w (with) K1=5 in FIG. 6) can be configured in the PUCCH from the slot (n+1) to the slot (n+4).

When K1=6 is configured by the DCI that schedules the PDSCH #1, the transmission of the A/N (PDSCH #1w (with) K1=6 in FIG. 6) can be configured in the PUCCH from the slot (n+2) to the slot (n+5).

When K1=7 is configured by the DCI that schedules the PDSCH #1, the transmission of the A/N (PDSCH #1w (with) K1=7 in FIG. 6) can be configured in the PUCCH from the slot (n+3) to a slot (n+6) (not shown).

The DCI that schedules the PDSCH #2 configures the HARQ-ACK transmission timing K1 for the PDSCH #2.

When K1=4 is configured by the DCI that schedules the PDSCH #2, the transmission of the A/N (PDSCH #2w (with) K1=4 in FIG. 6) can be configured in the PUCCH from the slot (n+1) to the slot (n+4).

When K1=5 is configured by the DCI that schedules the PDSCH #2, the transmission of the A/N (PDSCH #2w (with) K1=5 in FIG. 6) can be configured in the PUCCH from the slot (n+2) to the slot (n+5).

When K1=6 is configured by the DCI that schedules the PDSCH #2, the transmission of the A/N (PDSCH #2w (with) K1=6 in FIG. 6) can be configured in the PUCCH from the slot (n+3) to a slot (n+6) (not shown).

When K1=7 is configured by the DCI that schedules the PDSCH #2, the transmission of the A/N (PDSCH #2w (with) K1=7 in FIG. 6) can be configured in the PUCCH from the slot (n+4) to a slot (n+7) (not shown).

The DCI that schedules PDSCH #3 and PDSCH #4 configures the HARQ-ACK transmission timing K1 for the PDSCH #3 or the PDSCH #4.

When K1=4 is configured by the DCI that schedules the PDSCH #3 and the PDSCH #4, the transmission of the A/N (PDSCH #3w (with) K1=4 and PDSCH #4w (with) K1=4 in FIG. 6) can be configured in the PUCCH from the slot (n+2) to the slot (n+5).

When K1=5 is configured by the DCI that schedules the PDSCH #3 and the PDSCH #4, the transmission of the A/N (PDSCH #3w (with) K1=5 and PDSCH #4w (with) K1=5 in FIG. 6) can be configured in the PUCCH from the slot (n+3) to a slot (n+6) (not shown).

When K1=6 is configured by the DCI that schedules the PDSCH #3 and the PDSCH #4, the transmission of the A/N (PDSCH #3w (with) K1=6 and PDSCH #4w (with) K1=6 in FIG. 6) can be configured in the PUCCH from the slot (n+4) to a slot (n+7) (not shown).

When K1=7 is configured by the DCI that schedules the PDSCH #3 and the PDSCH #4, the transmission of the A/N (PDSCH #3w (with) K1=7 and PDSCH #4w (with) K1=7 in FIG. 6) can be configured in the PUCCH from the slot (n+5) to a slot (n+8) (not shown).

In the example shown in FIG. 6, the user terminal needs to generate one HARQ-ACK information bit in the slot n, 3 HARQ-ACK information bits in the slot (n+1), 7 HARQ-ACK information bits in the slot (n+2), 11 HARQ-ACK information bits in the slot (n+3), 13 HARQ-ACK information bits in the slot (n+4), and 13 HARQ-ACK information bits in the slot (n+5), regardless of which HARQ-ACK transmission timing K1 value is configured by DCI.

As shown in FIG. 6, when it is assumed that the codebook size or the PUCCH format is different in each slot during PUCCH repetition transmission, at least one of the codebook size and the PUCCH format may be different in each slot. Therefore, for example, on a receiving side (in this case, the base station), there is a problem that it is difficult to apply the soft combining of repeated PUCCH.

Therefore, the user terminal may determine at least one of the codebook size and the PUCCH format between PUCCH repetitions by a maximum required codebook size between the PUCCH repetitions.

The user terminal is notified by at least (1) a candidate occasion of PDSCH identified from RRC, (2) a list of K1 values configured by RRC, and (3) a PUCCH repetition factor notified by RRC, regarding the semi-static HARQ-ACK codebook. Therefore, the user terminal can determine in advance the maximum required codebook size between the PUCCH repetitions.

The user terminal may determine at least one of the codebook size per slot and the PUCCH format so as to maintain the maximum required codebook size between the PUCCH repetitions.

Figure 7:
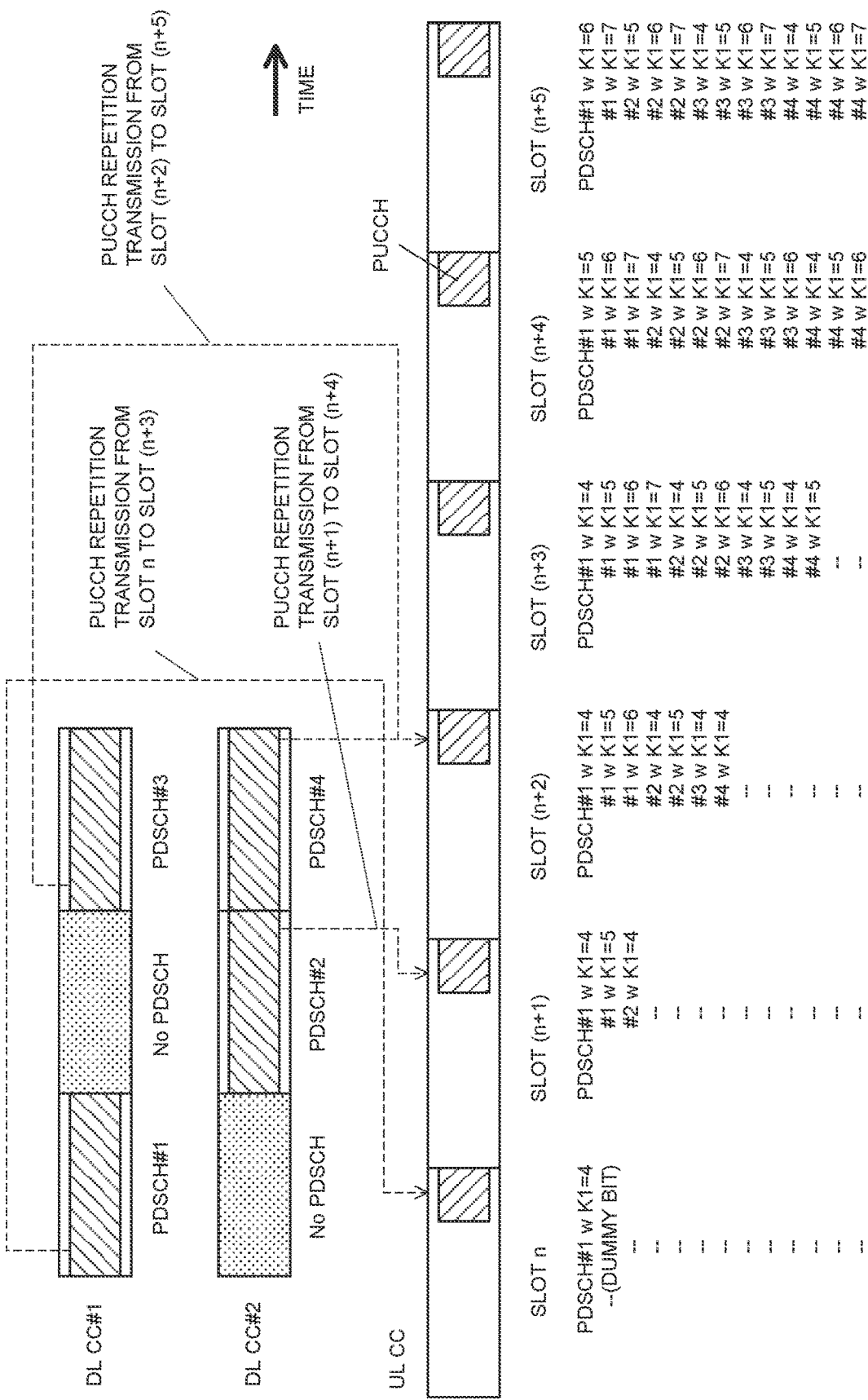
FIG. 7 is a diagram showing an example of a semi-static HARQ-ACK codebook configuration according to the third embodiment.

FIG. 7 is a diagram showing an example of a semi-static HARQ-ACK codebook configuration according to the third embodiment. In the example shown in FIG. 7, it is assumed that K=4 is configured as the value of the repetition factor K of the PUCCH repetition transmission in the user terminal.

In the example shown in FIG. 7, in the slot (n+4) or the slot (n+5), 13 A/N transmissions, which are the maximum required codebook size between the PUCCH repetitions, are configured. The user terminal configures a dummy bit in the slot n to the slot (n+3) in order to make the codebook size the same as the maximum required codebook size.

For example, since it is necessary to generate one HARQ-ACK information bit in the slot n, the user terminal configures 12 dummy bits. The dummy bits may be all 0s or 1s, or may be a scrambled sequence generated by a given known code.

By configuring the dummy bits, at least one of the codebook size and the PUCCH format can be aligned between the PUCCH repetitions.

In the example shown in FIG. 6, the user terminal transmits ACK/NACK for PDSCH candidates that can be scheduled, except for a specific exception condition. Therefore, a valid HARQ-ACK is reported in all HARQ-ACK feedback occasions.

The user terminal may report only valid HARQ-ACKs based on the configured transmission timing K1 of HARQ-ACK and the repetition factor K of PUCCH repetition transmission.

Figure 8:
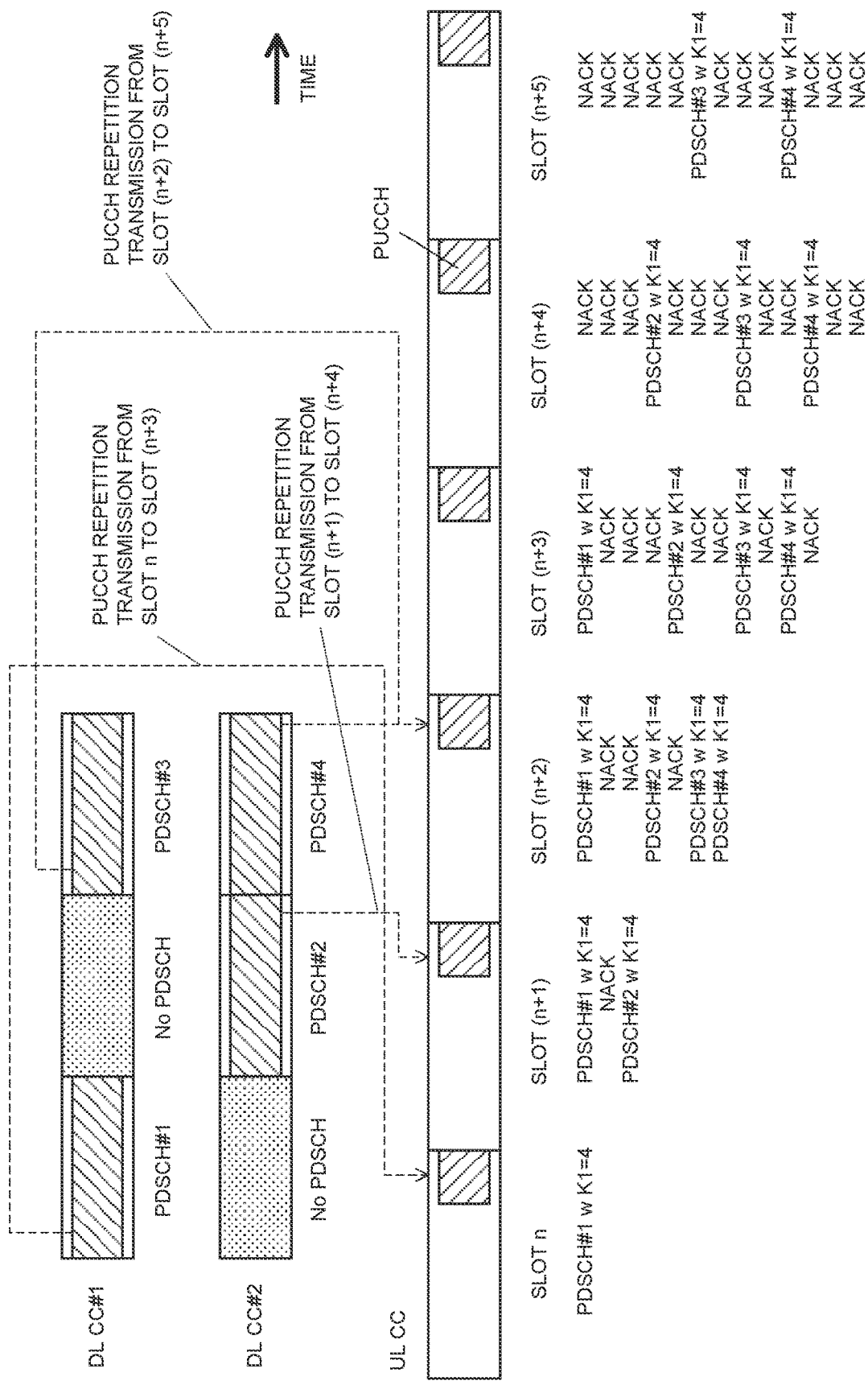
FIG. 8 is a diagram showing an example of a semi-static HARQ-ACK codebook configuration according to the third embodiment.

FIG. 8 is a diagram showing an example of a semi-static HARQ-ACK codebook configuration according to the third embodiment. In the example shown in FIG. 8, it is assumed that K1={4, 5, 6, 7} is configured as the transmission timing K1 of HARQ-ACK on the user terminal, and K1=4 is configured as a valid value of K1. It is assumed that the user terminal configures K=4 as a value of the repetition factor K of the PUCCH repetition transmission.

As shown in FIG. 8, the user terminal may report the valid HARQ-ACK only if K1=4 is configured by each DCI that schedules PDSCHs #1 through #4. The user terminal may report NACK if it is assumed that K1={5, 6, 7} is configured by each DCI that schedules PDSCHs #1 through #4.

Thus, the HARQ-ACK codebook may include HARQ-ACK that is valid for all PDSCHs, except for a specific exception condition, and may include only HARQ-ACKs that are valid only for PDSCHs associated with subsequent PDCCHs.

The HARQ-ACK codebook size may include HARQ-ACKs that are valid for X PDSCHs. Here, X≤Y, where Y is the number of all associated PDSCHs, and X is the number of PDSCHs determined depending on the maximum payload of the indicated PUCCH resource. The user terminal may drop (Y−X) HARQ-ACKs for the associated PDSCH.

Next, a bit order in the semi-static HARQ-ACK codebook when PUCCH is repeatedly transmitted will be described.

The bit order in the semi-static HARQ-ACK codebook when PUCCH is repeatedly transmitted may be determined by either the rule in which (1) the PDSCH occasions are arranged in order from the earliest to the latest, (2) the CC index is arranged in order from the lowest to the highest, or (3) the values of K1 are arranged in order from the smallest to the largest, or a combination thereof.

Figure 9:
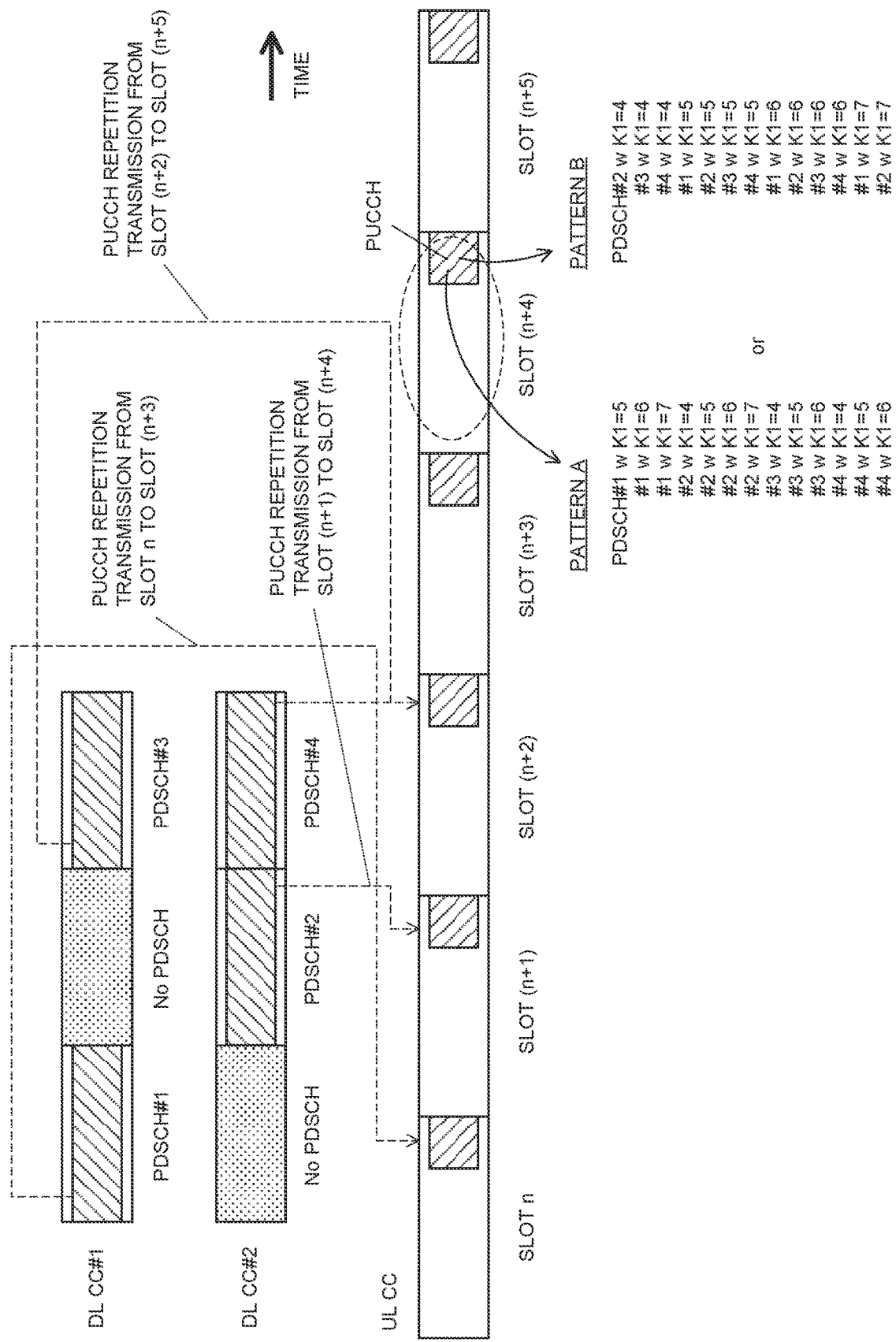
FIG. 9 is a diagram showing an example of a bit order in a semi-static HARQ-ACK codebook according to the third embodiment.

FIG. 9 is a diagram showing an example of a bit order in the semi-static HARQ-ACK codebook according to the third embodiment. As shown in FIG. 6, the user terminal configures the HARQ-ACK information bit in each slot of the UL component carrier.

In the example shown in FIG. 9, a pattern A and a pattern B are shown as the bit order of the HARQ-ACK information bits in the slot (n+4).

The pattern A in FIG. 9 shows an example of determining the bit order in the HARQ-ACK codebook by applying (1) the rule in which PDSCH occasions are arranged from the earliest to the latest, and then applying (3) the rule in which the K1 values are arranged from the smallest to the largest.

The pattern B of FIG. 9 shows an example of determining the bit order in the HARQ-ACK codebook by applying (3) the rule in which the K1 values are arranged from the smallest to the largest and then applying (1) the rule in which PDSCH occasions are arranged in from the earliest to the latest.

Alternatively, the bit order in the semi-static HARQ-ACK codebook when PUCCH is repeatedly transmitted may be determined by either the rule in which (4) PDSCH occasions are arranged from the latest to the earliest, (5) CC indexes are arranged from the highest to the lowest, or (6) K1 values are arranged from the largest to the smallest, or a combination thereof.

Figure 10:
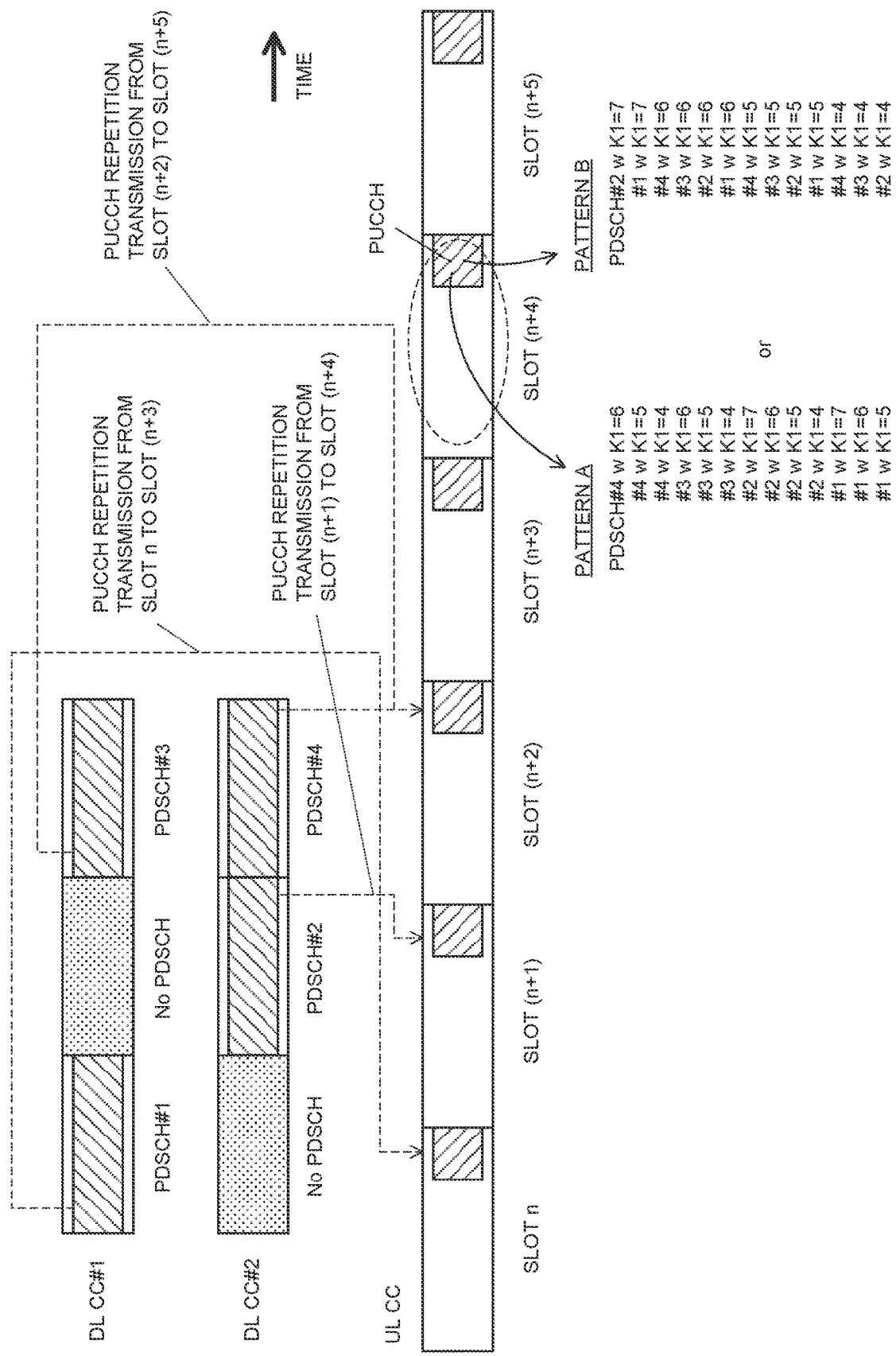
FIG. 10 is a diagram showing an example of a bit order in a semi-static HARQ-ACK codebook according to the third embodiment.

FIG. 10 is a diagram showing an example of the bit order in the semi-static HARQ-ACK codebook according to the third embodiment. As shown in FIG. 6, the user terminal configures the HARQ-ACK information bit in each slot of the UL component carrier.

In the example shown in FIG. 10, a pattern A and a pattern B are shown as the bit order of the HARQ-ACK information bits in the slot (n+4).

The pattern A in FIG. 10 shows an example of determining the bit order in the HARQ-ACK codebook by applying (4) the rule in which PDSCH occasions are arranged from the latest to the earliest, and then applying (6) the rule in which the K1 values are arranged from the largest to the smallest.

The pattern B in FIG. 10 shows an example of determining the bit order in the HARQ-ACK codebook by applying (6) the rule in which the K1 values are arranged from the largest to the smallest, and then applying (4) the rule in which PDSCH occasions are arranged from the latest to the earliest.

FIGS. 9 and 10 show the example in which the bit order of the HARQ-ACK information bits is determined by applying any two of the rules (1) to (3) or (4) to (6) in combination, but the method for determining the bit order is not limited thereto. The bit order may be determined by applying any one of the rules (1) to (3) or (4) to (6). The bit order is determined by applying any two combinations other than the combinations shown in FIGS. 9 and 10 from the rules (1) to (3) or (4) to (6). In addition, the bit order of the HARQ-ACK information bits shown above can be similarly determined by (1) to (6) even when the PUCCH repetition transmission is not performed.

According to the third embodiment, the user terminal can select and transmit an appropriate UCI even when overlap of the PUCCH repetition transmission occurs.

Fourth Embodiment

In a fourth embodiment, a user terminal configured for PUCCH repetition transmission may schedule PDSCHs such that HARQ-ACKs for different PDSCHs in one or more slots are repeatedly transmitted with non-overlapping symbols in one control unit, for example, a serving cell in a cell group or a PUCCH group. The user terminal may report the UE capability signaling for notifying whether such scheduling is possible to the base station by higher layer signaling.

The user terminal may assume that the periods for the plurality of PUCCH repetition transmissions overlap, while the resources for the respective PUCCH repetition transmissions do not overlap in time.

Figure 11:
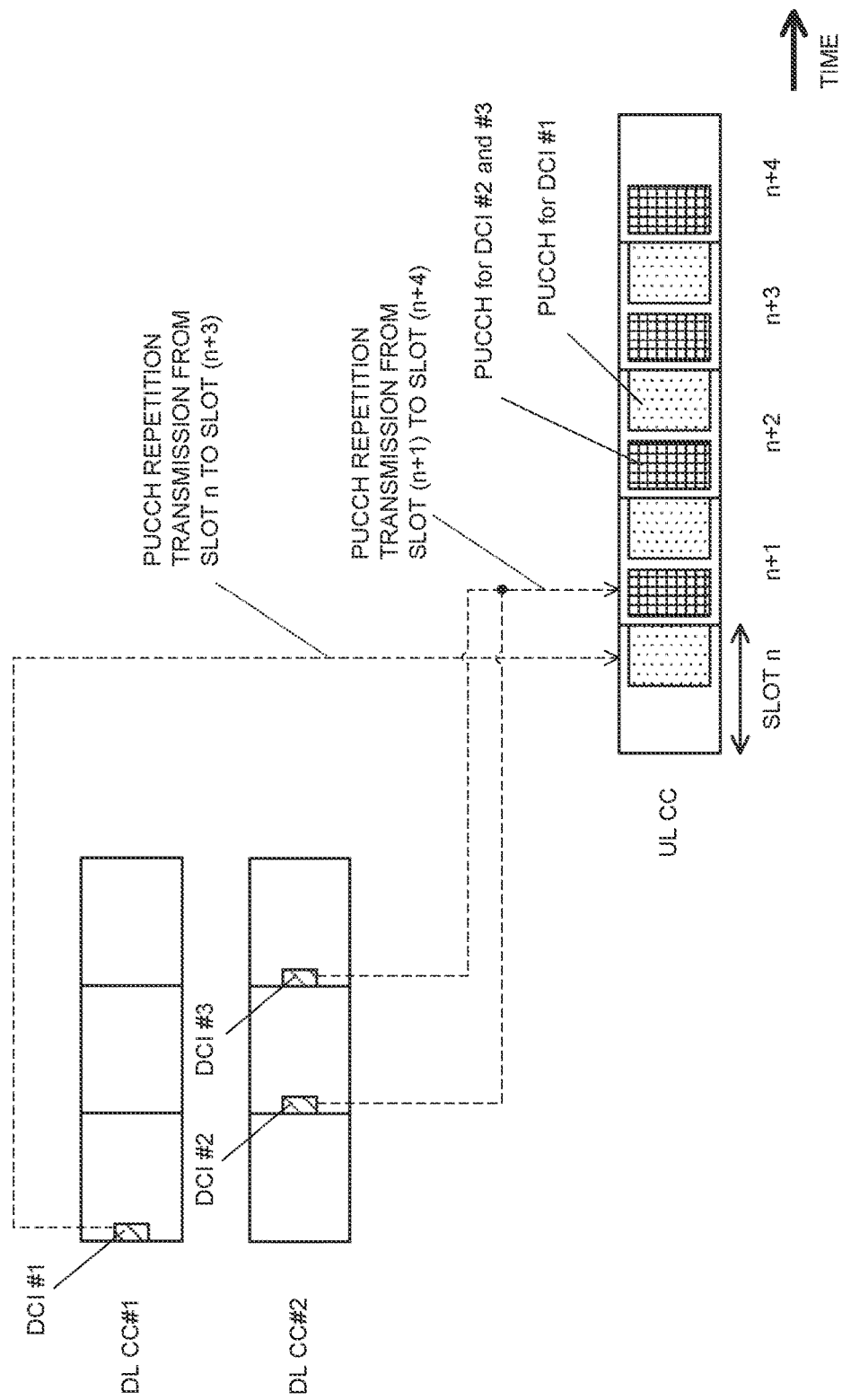
FIG. 11 is a diagram showing an example of PUCCH repetition transmission according to a fourth embodiment.

FIG. 11 is a diagram showing an example of PUCCH repetition transmission according to the fourth embodiment. The example shown in FIG. 11 is different from the example shown in FIG. 4 in that the user terminal does not receive DCI #3 on DL CC #1 and detects DCI #3 indicating the PUCCH repetition transmission from the slot (n+1) to the slot (n+4) of UL CC in DL CC #2.

In the example shown in FIG. 11, the user terminal starts the PUCCH repetition transmission from the slot n to the slot (n+3) based on DCI #1. The user terminal starts the PUCCH repetition transmission from the slot (n+1) to the slot (n+4) based on DCI #2 and DCI #3. For example, in the slot (n+1), PUCCH based on DCI #1 and PUCCH based on DCI #2 and DCI #3 are scheduled for different symbols.

Since the PUCCH resource for HARQ-ACK transmission of DCI #1 is different from the PUCCH resource for HARQ-ACK transmission of DCI #2 and DCI #3, the codebook size and the PUCCH format for the PUCCH repetition transmissions may be differently determined. The user terminal may determine the PUCCH resource for HARQ-ACK transmission of DCI based on at least one of the DCI and the higher layer signaling (for example, RRC signaling).

According to the fourth embodiment, the user terminal can transmit the UCI using different PUCCH resources even when the periods of the PUCCH repetition transmissions overlap.

Fifth Embodiment

In a fifth embodiment, it may be assumed that the user terminal configured for PUCCH repetition transmission has the following restrictions for PUCCH repetition transmission.

The user terminal does not repeat the HARQ-ACK transmission corresponding to the PDSCH transmission in the slot {x} in the slot n. Here, {x} corresponds to a slot or a slot group before a slot (n−K1) in time.

The user terminal transmits only a HARQ-ACK response corresponding to the PDSCH detected in the slot (n−K1) from the slot n to a slot (n+$N_{ANRep}$−1). Here, $N_{ANRep}$ corresponds to the repetition factor.

The user terminal does not transmit any other signal or channel from the slot n to a slot (n+$N_{ANRep}$−1).

The user terminal does not repeatedly transmit the HARQ-ACK response corresponding to the PDSCH transmission detected in the slot (n+$N_{ANRep}$−K1−1) from the slot (n−K1).

The user terminal may assume that the base station limits the schedule of PDCCH (DCI) earlier than the certain DCI so that the PUCCH repetition transmission based on one DCI is overlapped with another PUCCH repetition transmission. The user terminal may assume that the base station limits the configuration of HARQ-ACK feedback for a PDCCH (DCI) earlier than the DCI so that the PUCCH repetition transmission based on one DCI is overlapped with another PUCCH repetition transmission.

According to the fifth embodiment, the overlap of the PUCCH repetition transmission can be suppressed, and the complexity of processing on the user terminal can be suppressed.

<Others>

The generation of HARQ-ACK, the transmission of HARQ-ACK, the determination of HARQ-ACK, and the identification of HARQ-ACK according to the present disclosure may be replaced with one another. The HARQ-ACK, ACK, NACK, A/N, HARQ-ACK bits, and the like in the present disclosure may be replaced with one another. The HARQ-ACK may be replaced with any UCI, for example, SR or CSI, or any combination of UCIs.

The base station may perform UCI or HARQ-ACK reception processing (decoding, and the like) assuming the operation of the user terminal of each embodiment, or may schedule PDSCH, DCI, and the like for the user terminal.

(Radio Communication System) Now, the structure of a radio communication system according to the present embodiment will be described below. A radio communication method according to the above embodiments is applied to this radio communication system.

Figure 12:
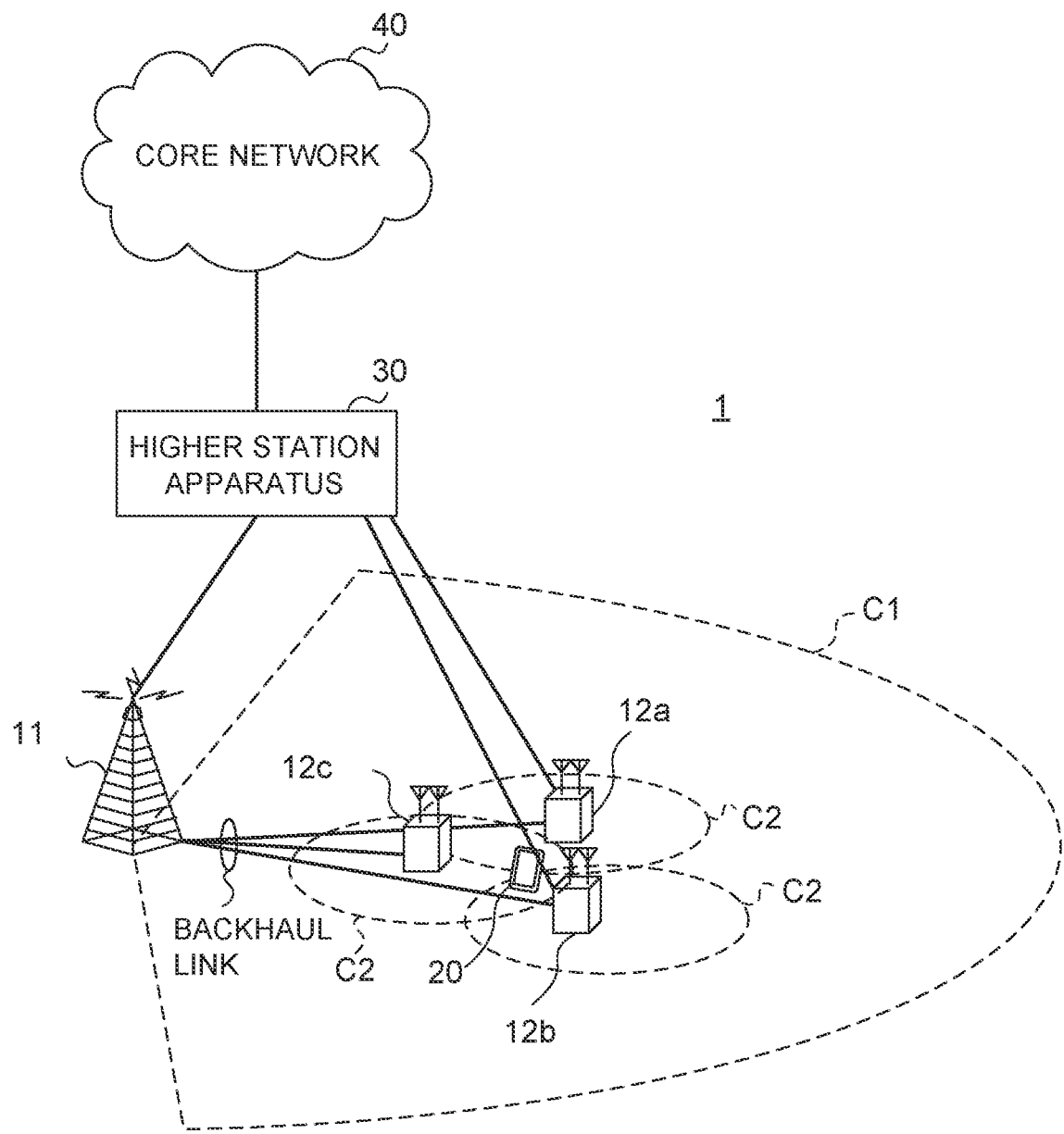
FIG. 12 is a diagram showing an example of a schematic structure of a radio communication system according to the present embodiment.

FIG. 12 is a diagram showing an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. The radio communication system 1 may be referred to as "SUPER 3G," "LTE-A (LIE-Advanced)," "IMT-Advanced," "4G," "5G," "FRA (Future Radio Access)," "NR (New Radio)".

The radio communication system 1 includes a radio base station 11 that forms a macro cell C1 and radio base stations 12a to 12c that are placed within the macro cell C1 and that form small cells C2, which are narrower than the macro cell C1. User terminals 20 are placed in the macro cell C1 and in each small cell C2. A configuration in which different numerologies are applied between cells may be adopted. The numerology refers to a signal design in certain RAT or a set of communication parameters that characterize the RAT design.

The user terminals 20 can connect with both the base station 11 and the base stations 12. It is assumed that the user terminal 20 simultaneously uses the macro cell C1 and the small cell C2, which use different frequencies, by carrier aggregation (CA) or dual connectivity (DC). The user terminal 20 can apply carrier aggregation (CA) or dual connectivity (DC) using a plurality of cells (CC) (for example, two or more CCs). The user terminal can use a licensed band CC and an unlicensed band CC as a plurality of cells. It is possible to adopt a configuration in which a TDD carrier to which the shortened TTI is applied is included in any of the plurality of cells.

Between the user terminal 20 and the base station 11, communication can be performed using a carrier with a narrow bandwidth in a relatively low frequency band (for example, 2 GHz) (this carrier is also referred to as "existing carrier", "Legacy carrier", or the like). Between the user terminals 20 and the base stations 12, a carrier of a relatively high frequency band (for example, 3.5 GHz, 5 GHz, 30 to 70 GHz, and so on) and a wide bandwidth may be used, or the same carrier as that used in the base station 11 may be used. The structure of the frequency band for use in each base station is by no means limited to these.

A configuration can be employed here in which wired connection (for example, means in compliance with common public radio interface (CPRI) such as optical fiber and X2 interface) or radio connection is established between the base station 11 and the base station 12 (or between two base stations 12).

The base station 11 and the base stations 12 are each connected with a higher station apparatus 30, and are connected with a core network 40 via the higher station apparatus 30. The higher station apparatus 30 may be, for example, access gateway apparatus, a radio network controller (RNC), a mobility management entity (MME) and so on, but is by no means limited to these. Each base station 12 may be connected with the higher station apparatus 30 via the base station 11.

Note that the base station 11 is a base station having a relatively wide coverage, and may be referred to as a "macro base station," an "aggregate node," an "eNB (eNodeB)," a "transmitting/receiving point" and so on. The base stations 12 are base stations having local coverages, and may be referred to as "small base stations," "micro base stations," "pico base stations," "femto base stations," "HeNBs (Home eNodeBs)," "RRHs (Remote Radio Heads)," "transmitting/ receiving points" and so on. Hereinafter the base stations 11 and 12 will be collectively referred to as "base station 10," unless specified otherwise.

Each user terminal 20 is a terminal that supports various communication methods such as LTE and LTE-A, and may include not only a mobile communication terminal but also a stationary communication terminal.

In the radio communication system 1, as radio access schemes, OFDMA (Orthogonal Frequency Division Multiple Access) can be applied to the downlink (DL), and SC-FDMA (Single Carrier-Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. The uplink and downlink radio access schemes are not limited to the combinations of these, and OFDMA may be used in the UL.

In the radio communication system 1, a downlink data channel (PDSCH (Physical Downlink Shared Channel), which is also referred to as a "downlink shared channel" and so on), which is used by each user terminal 20 on a shared basis, a broadcast channel (PBCH (Physical Broadcast Channel)), L1/L2 control channels and so on are used as a DL channel. User data, higher layer control information, and system information blocks (SIBs) are communicated in the PDSCH. The MIB (Master Information Block) is communicated in the PBCH.

The L1/L2 control channels include downlink control channels (physical downlink control channel (PDCCH), enhanced physical downlink control channel (EPDCCH), physical control format indicator channel (PCFICH), physical hybrid-ARQ indicator channel (PHICH), and the like. Downlink control information (DCI), including PDSCH and PUSCH scheduling information, and the like, is communicated by the PDCCH. The number of OFDM symbols to use for the PDCCH is communicated by the PCFICH. Delivery acknowledgment information (ACK/NACK) of HARQ to PUSCH is communicated by the PHICH. The EPDCCH is frequency-division-multiplexed with the PDSCH (downlink shared data channel) and used to communicate DCI and so on, like the PDCCH.

In the radio communication system 1, an uplink data channel (PUSCH (Physical Uplink Shared Channel), which is also referred to as an "uplink shared channel" and so on), which is used by each user terminal 20 on a shared basis, an uplink control channel (PUCCH (Physical Uplink Control Channel)), a random access channel (PRACH (Physical Random Access Channel)) and so on are used as UL channels. User data and higher layer control information are communicated by the PUSCH. Uplink control information (UCI (Uplink Control Information), including at least one of delivery acknowledgment information (ACK/NACK) and radio quality information (CQI), is communicated by the PUSCH or the PUCCH. By means of the PRACH, random access preambles for establishing connections with cells are communicated.

<Base Station>

Figure 13:
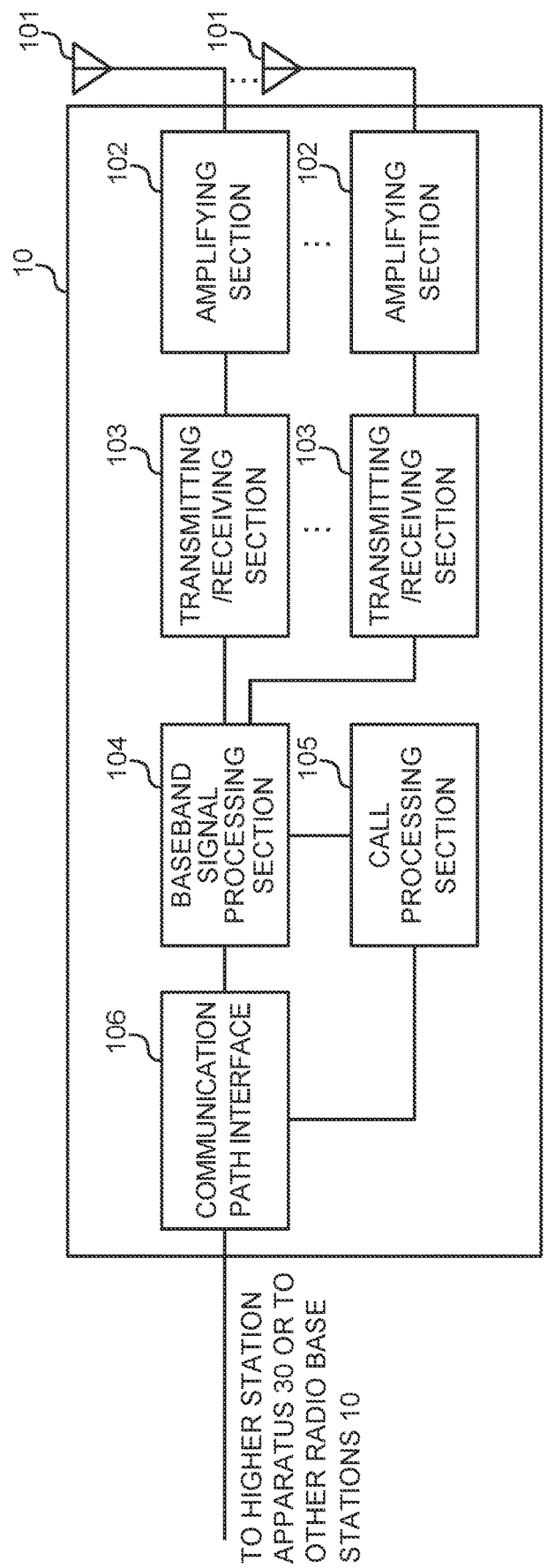
FIG. 13 is a diagram showing an example of a functional structure of a radio base station according to the present embodiment.

FIG. 13 is a diagram showing an example of an overall structure of the base station according to the present embodiment. A base station 10 has a plurality of transmitting/receiving antennas 101, amplifying sections 102, transmitting/receiving sections 103, a base band signal processing section 104, a call processing section 105 and a communication path interface 106. One or more transmitting/receiving antennas 101, amplifying sections 102 and transmitting/receiving sections 103 may be provided. The base station 10 is downlink data transmitting apparatus and may be uplink data receiving apparatus.

Downlink data to be transmitted from the base station 10 to the user terminal 20 is input from the higher station apparatus 30 to the base band signal processing section 104, via the communication path interface 106.

In the base band signal processing section 104, the downlink data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Downlink control signals are also subjected to transmission processings such as channel coding and inverse fast Fourier transform, and are forwarded to the transmitting/receiving sections 103.

Each of the transmitting/receiving sections 103 converts a base band signal, which is pre-coded for each antenna and output from the baseband signal processing section 104, into a radio frequency band, and transmits such a radio frequency signal. The radio frequency signals having been subjected to frequency conversion in the transmitting/receiving sections 103 are amplified in the amplifying sections 102, and transmitted from the transmitting/receiving antennas 101. The transmitting/receiving section 103 can be constituted by a transmitters/receiver, a transmitting/receiving circuit or transmitting/receiving apparatus that can be described based on general understanding of the technical field to which the present invention pertains. The transmitting/receiving section 103 may be structured as a transmitting/receiving section in one entity, or may be constituted by a transmitting section and a receiving section.

As for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the base band signal processing section 104.

In the base band signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processes such as configuring and releasing communication channels, manages states of the base stations 10, and manages radio resources.

The communication path interface 106 transmits and receives signals to and from the higher station apparatus 30 via a given interface. The communication path interface 106 may transmit and receive signals (backhaul signaling) with other base stations 10 via an inter-base station interface (which is, for example, optical fiber that is in compliance with the CPRI (Common Public Radio Interface), the X2 interface, etc.).

The transmitting/receiving section 103 may further include an analog beam forming section that performs analog beam forming. The analog beam forming section can be constituted by an analog beam forming circuit (for example, a phase shifter, a phase shift circuit) or an analog beam forming apparatus (for example, a phase shifter) described based on common understanding of the technical field to which the present invention pertains. The transmitting/receiving antenna 101 can be constituted by an array antenna, for example. The transmitting/receiving section 103 is configured such that that single BF and multi BF can be used.

The transmitting/receiving section 103 may transmit a signal using a transmission beam and may receive a signal using a reception beam. The transmitting/receiving section 103 may transmit and/or receive a signal using a given beam determined by the control section 301.

The transmitting/receiving section 103 transmits a downlink signal (for example, a downlink control signal (downlink control channel), a downlink data signal (downlink data channel, downlink shared channel), a downlink reference signal (DM-RS, CSI-RS, etc.), a discovery signal, a synchronization signal, a broadcast signal, etc.). The transmitting/receiving section 103 receives an uplink signal (for example, an uplink control signal (uplink control channel), an uplink data signal (uplink data channel, uplink shared channel), an uplink reference signal, etc.).

The transmitting/receiving section 103 transmits one or more PDSCHs in which candidate occasions are configured across a plurality of slots.

The transmitting/receiving section 103 may transmit configuration information for configuring the PUCCH repetition transmission and the semi-static HARQ-ACK codebook to the user terminal 20. The configuration information of the PUCCH repetition transmission and the configuration information of the semi-static HARQ-ACK codebook may be transmitted as separate information (for example, separate RRC parameters) or as a single piece of information.

The transmitting section and the receiving section of the present invention are constituted by both the transmitting/receiving section 103 and the communication path interface 106, or any one thereof.

Figure 14:
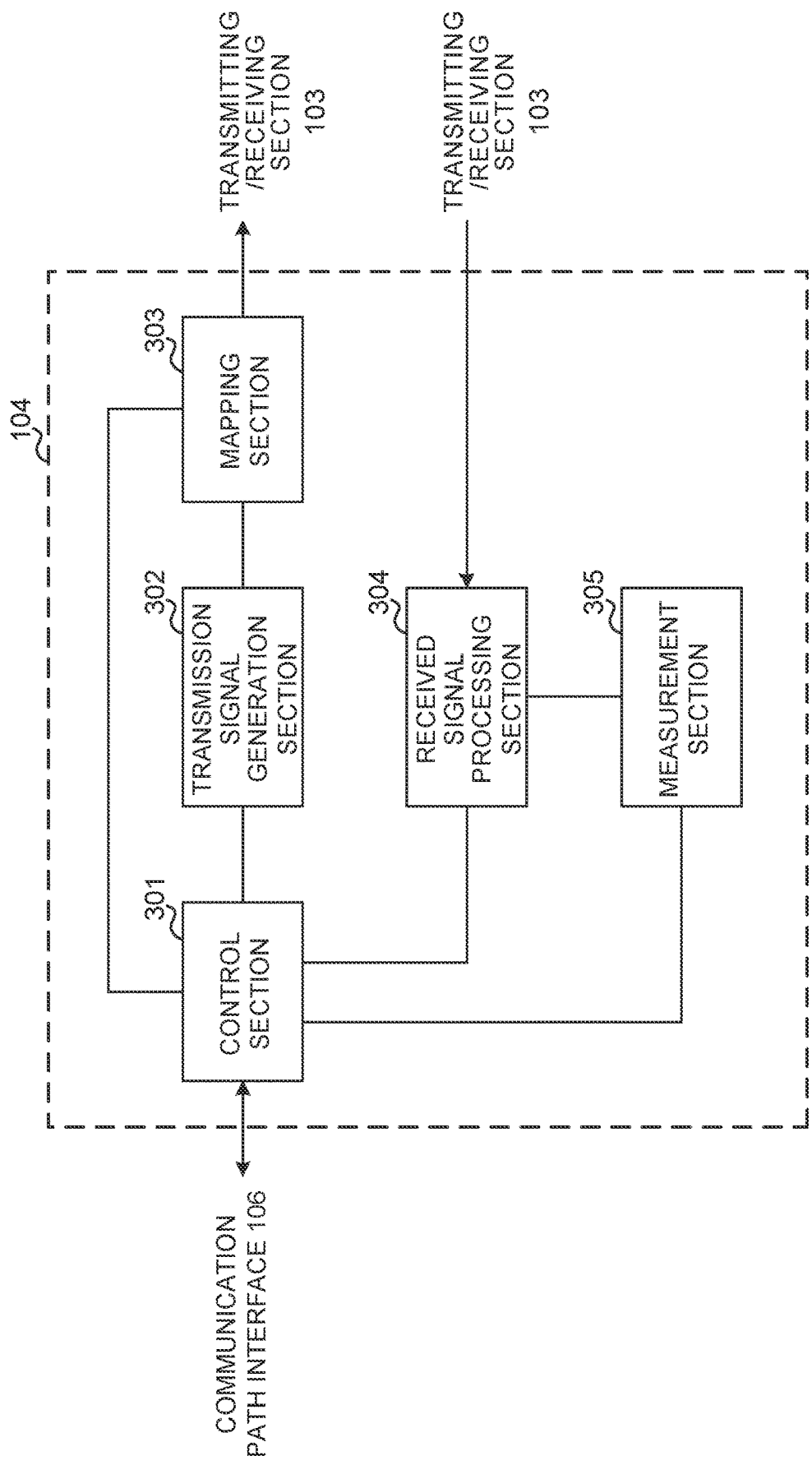
FIG. 14 is a diagram showing an example of a functional structure of a base band signal processing section of the radio base station.

FIG. 14 is a diagram showing an example of a functional configuration of the base station according to the present embodiment. Although this figure will primarily show functional blocks that pertain to characteristic parts of the present embodiment, the base station 10 has other functional blocks that are necessary for radio communication as well. The base band signal processing section 104 at least has a control section 301, a transmission signal generation section 302, a mapping section 303, a received signal processing section 304 and a measurement section 305.

The control section 301 controls the whole of the base station 10. The control section 301 can be constituted by a controller, a control circuit or control apparatus that can be described based on general understanding of the technical field to which the present invention pertains.

The control section 301, for example, controls the generation of signals in the transmission signal generation section 302, and the allocation of signals by the mapping section 303. The control section 301 controls the signal receiving processes in the received signal processing section 304, and the measurements of signals in the measurement section 305.

The control section 301 controls scheduling (for example, resource allocation) of downlink signals and/or uplink signals. Specifically, the control section 301 controls the transmission signal generation section 302, the mapping section 303, and the transmitting/receiving sections 103 so as to generate and transmit DCI including scheduling information of downlink data channels (DL assignment, DL grant), and DCI including scheduling information of uplink data channel (UL grant).

The control section 301 may configures that the codebook size or the PUCCH format is different in each slot during PUCCH repetition transmission, and may control at least one of DCI and PDSCH scheduling for the user terminal 20 so that the user terminal 20 performs the PUCCH repetition transmission using the codebook or the PUCCH format.

The transmission signal generation section 302 generates downlink signals (downlink control channels, downlink data channels, downlink reference signals such as DM-RS and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. For example, the received signals include, for example, uplink signals transmitted from the user terminals 20 (uplink control channels, uplink data channels, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, the received processing section 304 outputs at least one of the preamble, control information, and the UL data to the control section 301. Also, the received signal processing section 304 outputs the received signals or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure, for example, the received power (for example, RSRP (Reference Signal Received Power)) of the received signal, the reception quality (for example, RSRQ (Reference Signal Received Quality)), the channel state and so on. The measurement results may be output to the control section 301.

<User Terminal>

Figure 15:
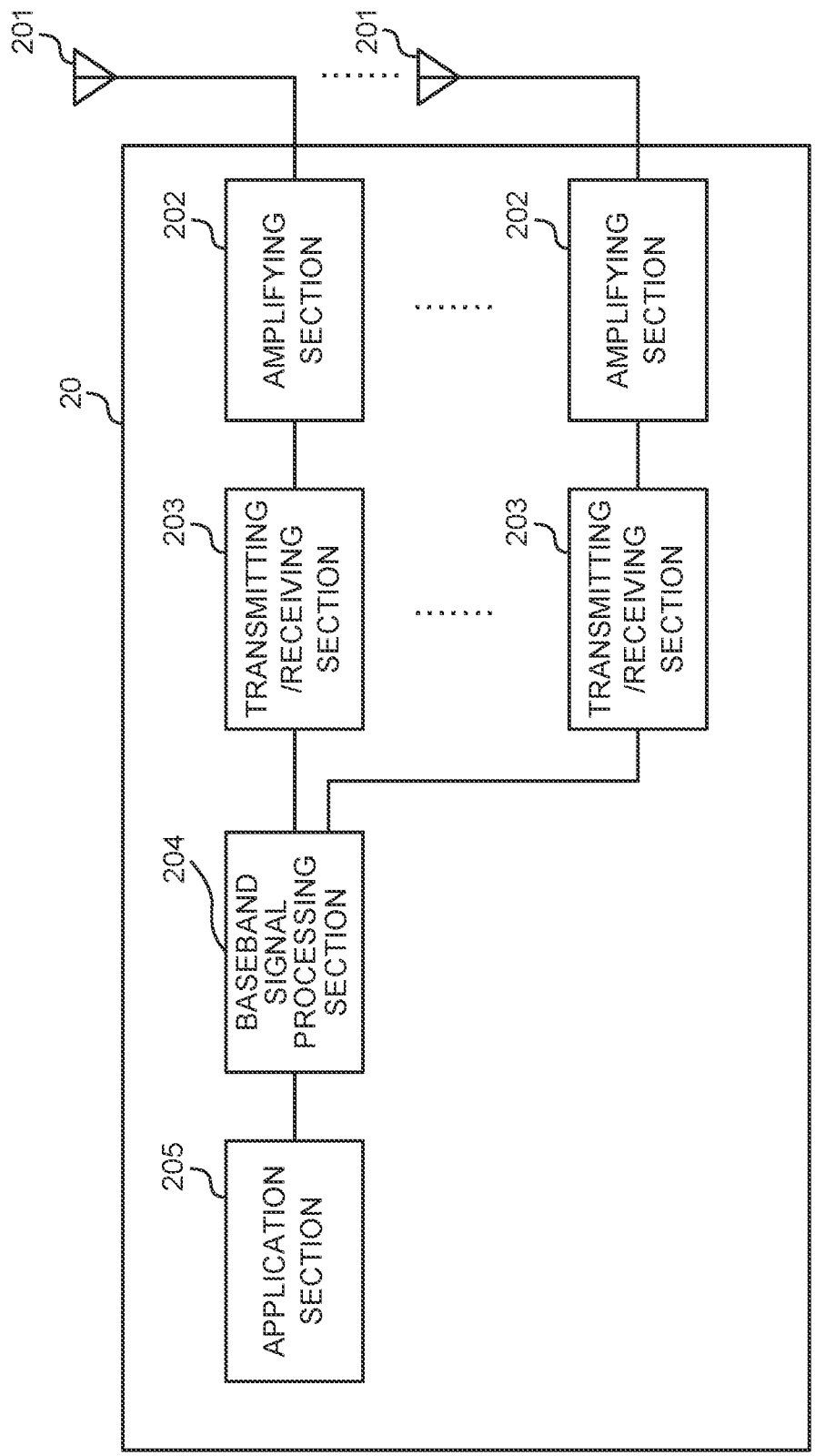
FIG. 15 is a diagram showing an example of a functional structure of a user terminal according to the present embodiment.

FIG. 15 is a diagram showing an example of an overall configuration of a user terminal according to the present embodiment. A user terminal 20 has a plurality of transmitting/receiving antennas 201, amplifying sections 202, transmitting/receiving sections 203, a base band signal processing section 204 and an application section 205. One or more transmitting/receiving antennas 201, amplifying sections 202 and transmitting/receiving sections 203 may be provided. The user terminal 20 is downlink data receiving apparatus and may be uplink data transmitting apparatus.

Radio frequency signals that are received in the transmitting/receiving antennas 201 are amplified in the amplifying sections 202. The transmitting/receiving section 203 receives the downlink signal amplified in the amplifying section 202. The received signals are subjected to frequency conversion and converted into the base band signal in the transmitting/receiving sections 203, and output to the base band signal processing section 204. The transmitting/receiving section 203 can be constituted by a transmitters/receiver, a transmitting/receiving circuit or transmitting/receiving apparatus that can be described based on general understanding of the technical field to which the present invention pertains. The transmitting/receiving section 203 may be structured as a transmitting/receiving section in one entity, or may be constituted by a transmitting section and a receiving section.

The base band signal processing section 204 performs an FFT process, error correction decoding, a retransmission control receiving process, and the like on the input baseband signal. The downlink data is forwarded to the application section 205. The application section 205 performs processings related to higher layers than a physical layer and a MAC layer, and the like. The system information and the higher layer control information in the downlink data are also forwarded to the application section 205.

Uplink user data is input from the application section 205 to the base band signal processing section 204. The base band signal processing section 204 performs a retransmission control transmission processing (for example, an HARQ transmission processing), channel coding, precoding, a discrete Fourier transform (DFT) processing, an IFFT processing and so on, and the result is forwarded to the transmitting/receiving section 203. Base band signals that are output from the base band signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving section 203 may further include an analog beam forming section that performs analog beam forming. The analog beam forming section can be constituted by an analog beam forming circuit (for example, a phase shifter, a phase shift circuit) or an analog beam forming apparatus (for example, a phase shifter) described based on common understanding of the technical field to which the present invention pertains. The transmitting/receiving antenna 201 can be constituted by an array antenna, for example. The transmitting/receiving section 203 is configured such that single BF and multi BF can be used.

The transmitting/receiving section 203 may transmit a signal using a transmission beam and may receive a signal using a reception beam. The transmitting/receiving section 203 may transmit and/or receive a signal using a given beam determined by the control section 401.

The transmitting/receiving section 203 receives a downlink signal (for example, a downlink control signal (downlink control channel), a downlink data signal (downlink data channel, downlink shared channel), a downlink reference signal (DM-RS, CSI-RS, etc.), a discovery signal, a synchronization signal, a broadcast signal, etc.). The transmitting/receiving section 203 transmits an uplink signal (for example, an uplink control signal (uplink control channel), an uplink data signal (uplink data channel, uplink shared channel), an uplink reference signal, etc.).

The transmitting/receiving section 203 may transmit the HARQ-ACK based on the codebook determined by the control section 401 by applying the PUCCH repetition transmission.

Figure 16:
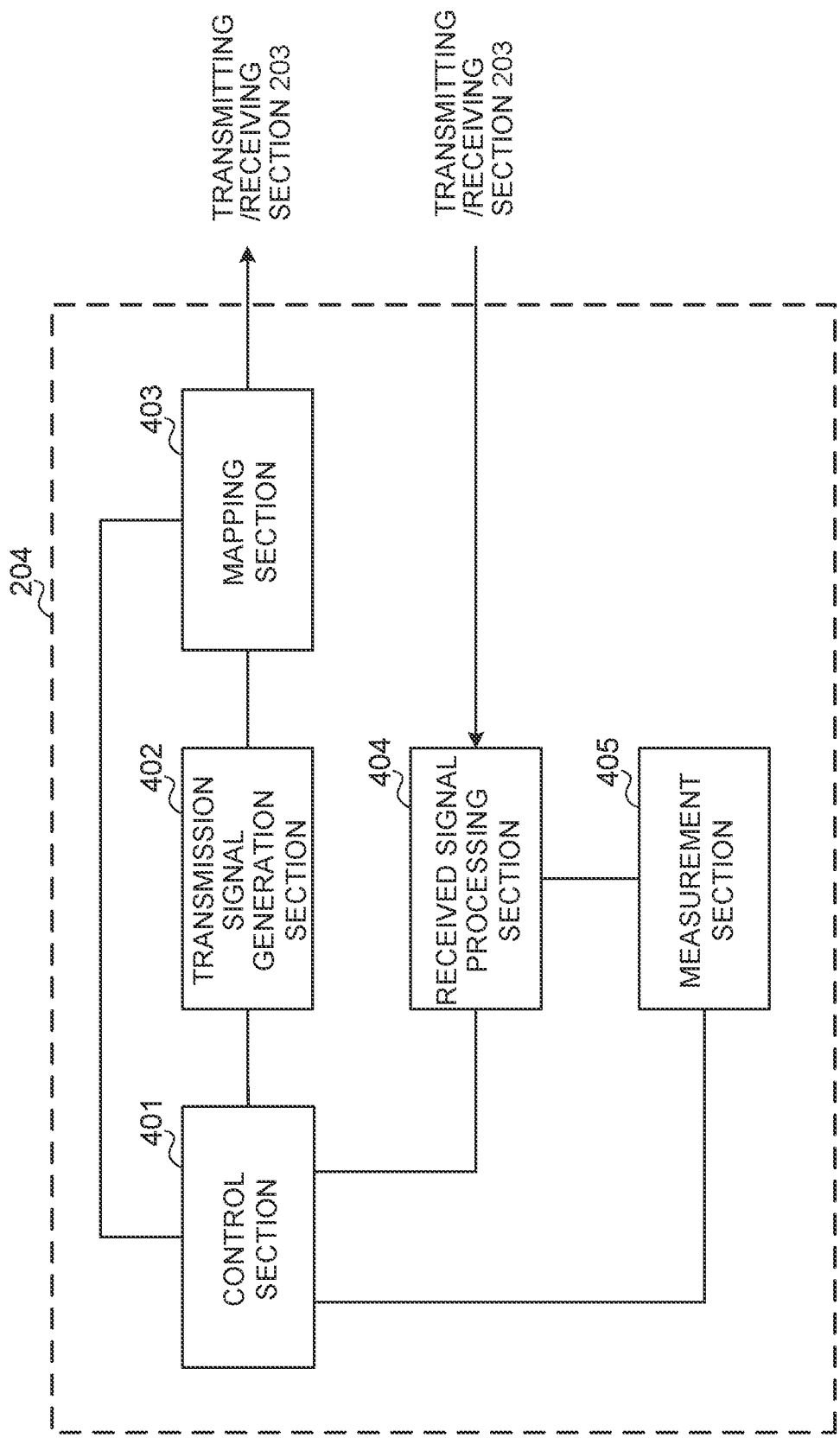
FIG. 16 is a diagram showing an example of a functional structure of a base band signal processing section of the user terminal.

FIG. 16 is a diagram showing an example of a functional configuration of the user terminal according to the present embodiment. Although this figure will primarily show functional blocks that pertain to characteristic parts of the present embodiment, the user terminal 20 has other functional blocks that are necessary for radio communication as well. The base band signal processing section 204 provided in the user terminal 20 at least has a control section 401, a transmission signal generation section 402, a mapping section 403, a received signal processing section 404 and a measurement section 405.

The control section 401 controls the whole of the user terminal 20. The control section 401 can be constituted by a controller, a control circuit or control apparatus that can be described based on general understanding of the technical field to which the present invention pertains.

The control section 401, for example, controls the generation of signals in the transmission signal generation section 402, and the allocation of signals by the mapping section 403. The control section 401 controls the signal receiving processes in the received signal processing section 404, and the measurements of signals in the measurement section 405.

When the uplink control channel (PUCCH) repetition transmission and the semi-static HARQ-ACK codebook are configured, the control section 401 may determine a codebook for PUCCH transmission per slot based on at least one of the downlink shared channel (PDSCH) candidate occasion, the timing of the HARQ-ACK transmission corresponding to the received PDSCH, and the PUCCH repetition factor.

The control section 401 may determine the codebook for PUCCH transmission per slot so as to maintain the maximum required codebook size between the PUCCH repetitions. The control section 401 may configure a dummy bit in order to maintain the maximum required codebook size.

The control section 401 may control to report a valid HARQ-ACK only when a valid PUCCH repetition factor is configured. The control section 401 may determine the bit order in the codebook by either the PDSCH candidate occasion, a component carrier index, or the HARQ-ACK transmission timing, or a combination thereof.

The transmission signal generation section 402 generates uplink signals (uplink control channels, uplink data channels, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

The transmission signal generation section 402 generates uplink data channels based on commands from the control section 401. For example, when a UL grant is included in a downlink control channel that is reported from the base station 10, the control section 401 commands the transmission signal generation section 402 to generate an uplink data channel.

The mapping section 403 maps the uplink signals generated in the transmission signal generation section 402 to radio resources based on commands from the control section 401, and output the result to the transmitting/receiving section 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. For example, the received signals include downlink signals (downlink control channels, downlink data channels, downlink reference signals, etc.) that are transmitted from the base station 10. For the received signal processing section 404, a signal processor, a signal processing circuit or signal processing apparatus that can be described based on general understanding of the technical field to which the present invention pertains can be used. The received signal processing section 404 can constitute the receiving section according to the present invention.

The received signal processing section 404 blind-decodes the downlink control channels that schedule the transmission and reception of the downlink data channels based on commands from the control section 401, and performs the receiving processes of the downlink data channels based on the DCI. The received signal processing section 404 estimates the channel gain based on DM-RS or CRS, and demodulates the downlink data channels based on the estimated channel gain.

The received signal processing section 404 output the decoded information that is acquired through the receiving processes to the control section 401. The received signal processing section 404 outputs, for example, broadcast information, system information, RRC signaling, DCI and so on, to the control section 401. The received signal processing section 404 may output the data decoding result to the control section 401. The received signal processing section 404 outputs the received signals or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received power (for example, RSRP) of the received signal, the DL reception quality (for example, RSRQ), the channel state and so on. The measurement results may be output to the control section 401.

(Hardware Structure)

The block diagrams that have been used to describe the above embodiments show blocks in functional units. These functional blocks (components) may be implemented in arbitrary combinations of at least one of hardware and software. The method for implementing each functional block is not particularly limited. That is, each functional block may be realized by one piece of apparatus that is physically or logically aggregated, or may be realized by directly or indirectly connecting two or more physically or logically separate pieces of apparatuses (via wire or wireless, for example) and using these multiple pieces of apparatuses. The functional block may be realized by combining the one apparatus or the plurality of apparatuses with software.

Here, the functions include decision, determination, judgment, calculation, computation, processing, derivation, investigation, search, confirmation, reception, transmission, output, access, resolving, selecting, choosing, establishing, comparing, assuming, expecting, considering, broadcasting, notifying, communicating, forwarding, configuring, reconfiguring, allocating, mapping, assigning, etc., are not limited thereto. For example, a functional block (component) for functioning for transmission may be referred to as a transmitting section (transmitting unit), a transmitter, or the like. In any case, as described above, the implementation method is not particularly limited.

Figure 17:
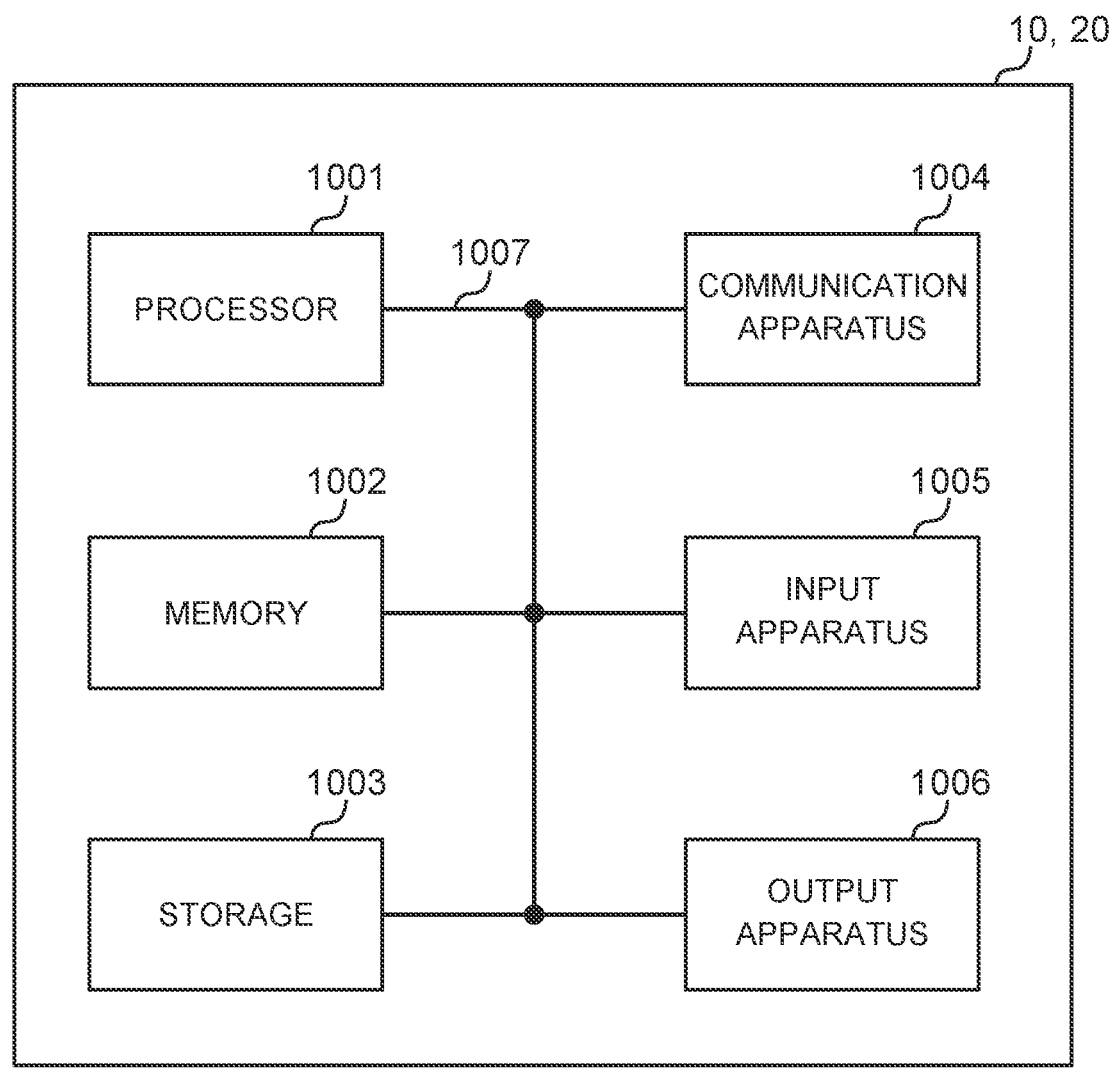
FIG. 17 is a diagram showing an example of a hardware structure of the radio base station and the user terminal according to an embodiment of the present invention.

For example, the base station, user terminals, and so on according to an embodiment of the present disclosure may function as a computer that executes the processings of the radio communication method of the present disclosure. FIG. 17 is a diagram showing an example of a hardware structure of the base station and the user terminal according to the embodiment. Physically, the above-described base stations 10 and user terminals 20 may be formed as a computer apparatus that includes a processor 1001, a memory 1002, a storage 1003, a communication apparatus 1004, an input apparatus 1005, an output apparatus 1006, and a bus 1007.

In the following description, the word "apparatus" may be replaced with "circuit," "device," "unit" and so on. The hardware structure of the base station 10 and the user terminal 20 may be configured to include one or more of each apparatus shown in the drawings, or may be configured not to include part of the apparatus.

For example, although only one processor 1001 is shown, a plurality of processors may be provided. Processings may be executed with one processor, or processings may be executed simultaneously, sequentially, or by other means by more than one processor. The processor 1001 may be implemented with one or more chips.

Each function of the base station 10 and the user terminal 20 is implemented by reading given software (program) on hardware such as the processor 1001 and the memory 1002 so that the processor 1001 performs computation, the communication in the communication apparatus 1004 is controlled, or at least one of the reading and writing of data in the memory 1002 and the storage 1003 is controlled.

The processor 1001 may control the whole computer by, for example, running an operating system. The processor 1001 may be configured with a central processing unit (CPU), which includes interfaces with peripheral equipment, control apparatus, computing apparatus, a register and so on. For example, the above-described base band signal processing section 104 (204), call processing section 105 and so on may be implemented by the processor 1001.

The processor 1001 reads programs (program codes), software modules or data, from at least one of the storage 1003 and the communication apparatus 1004, into the memory 1002, and executes various processings according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a read only memory (ROM), an erasable programmable ROM (EPROM), an electrically EPROM (EEPROM), a random access memory (RAM), and/or other appropriate storage media. The memory 1002 may be referred to as a "register," a "cache," a "main memory (primary storage apparatus)" and so on. The memory 1002 can store executable programs (program codes), software modules and/or the like for implementing the radio communication methods according to one embodiment of the present disclosure.

The storage 1003 is a computer-readable recording medium, and for example, may be composed of at least one of a flexible disk, a floppy (registered trademark) disk, a magneto-optical disk (for example, a compact disc (compact disc ROM (CD-ROM) and the like), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired network and wireless network, and may be referred to as, for example, a "network device," a "network controller," a "network card," a "communication module" and so on. The communication apparatus 1004 may be configured to include a high frequency switch, a duplexer, a filter, a frequency synthesizer and so on in order to implement, for example, at least one of frequency division duplex (FDD) and time division duplex (TDD). For example, the above-described transmitting/receiving antennas 101 (201), amplifying sections 102 (202), transmitting/receiving sections 103 (203), communication path interface 106 and so on may be implemented by the communication apparatus 1004. The transmitting/receiving section 103 may be physically or logically separated from a transmitting section 103a and a receiving section 103b.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, a light emitting diode (LED) lamp and so on). The input apparatus 1005 and the output apparatus 1006 may be provided in an integrated structure (for example, a touch panel).

These pieces of apparatuses, including the processor 1001, the memory 1002 and so on are connected by the bus 1007 so as to communicate information. The bus 1007 may be formed with a single bus, or may be formed with buses that vary between pieces of apparatuses.

The base station 10 and the user terminal 20 may be configured to include hardware such as a microprocessor, a digital signal processor (DSP), an application-specific integrated circuit (ASIC), a programmable logic device (PLD), and a field programmable gate array (FPGA), and all or some of the functional blocks may be implemented by the hardware. For example, the processor 1001 may be implemented with at least one of these pieces of hardware.

(Variations)

The terminology described in the present disclosure and the terminology that is needed to understand the present disclosure may be replaced with other terms that convey the same or similar meanings. For example, at least one of "channels" and "symbols" may be replaced by "signals" (or "signaling"). The signal may also be a message. A reference signal may be abbreviated as an RS, and may be referred to as a pilot, a pilot signal, and so on, depending on which standard applies. A "component carrier (CC)" may be referred to as a "cell," a "frequency carrier," a "carrier frequency" and so on.

A radio frame may be comprised of one or a plurality of periods (frames) in a time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Here, the numerology may be a communication parameter used for at least one of transmission and reception of a certain signal or channel. For example, the numerology may indicate at least one of SubCarrier Spacing (SCS), a bandwidth, a symbol length, a cyclic prefix length, a transmission time interval (TTI), the number of symbols per TTI, a radio frame structure, a specific filtering processing to be performed by a transceiver in the frequency domain, a specific windowing processing to be performed by a transceiver in the time domain and so on.

Furthermore, a slot may be comprised of one or a plurality of symbols in the time domain, for example, orthogonal frequency division multiplexing (OFDM) symbols, single carrier frequency division multiple access (SC-FDMA) symbols and so on. A slot may be a time unit based on numerology.

Also, a slot may include a plurality of mini slots. Each mini slot may be comprised of one or more symbols in the time domain. The mini slot may be referred to as a "subslot." Each mini slot may be comprised of fewer symbols than a slot. A PDSCH (or PUSCH) transmitted in a time unit larger than a mini slot may be referred to as PDSCH (PUSCH) mapping type A. A PDSCH (or PUSCH) transmitted using the mini slots may be referred to as "PDSCH (PUSCH) mapping type B."

A radio frame, a subframe, a slot, a mini slot and a symbol all represent the time unit in signal communication. A radio frame, a subframe, a slot, a mini slot and a symbol may be each called by other applicable names.

For example, one subframe may be referred to as a "transmission time interval (TTI)," or a plurality of consecutive subframes may be referred to as a "TTI," or one slot or mini slot may be referred to as a "TTI." That is, at least one of a subframe and a TTI may be a subframe (1 ms) in the existing LTE, may be a shorter period than 1 ms (for example, one to thirteen symbols), or may be a longer period of time than 1 ms. The unit to represent the TTI may be referred to as a "slot," a "mini slot" and so on, instead of a "subframe."

Here, a TTI refers to the minimum time unit of scheduling in radio communication, for example. For example, in LTE systems, a base station schedules the radio resources (such as the frequency bandwidth and transmission power that can be used in each user terminal) to allocate to each user terminal in TTI units. The definition of TTIs is not limited to this.

The TTI may be the transmission time unit of channel-encoded data packets (transport blocks), code blocks, codewords and so on, or may be the unit of processing in scheduling, link adaptation and so on. When a TTI is given, the period of time (for example, the number of symbols) in which transport blocks, code blocks, codewords and so on are actually mapped may be shorter than the TTI.

When one slot or one mini slot is referred to as a "TTI," one or more TTIs (that is, one or more slots or one or more mini slots) may be the minimum time unit of scheduling. The number of slots (the number of mini slots) to constitute this minimum time unit of scheduling may be controlled.

A TTI having a time duration of 1 ms may also be referred to as a "normal TTI (TTI in LTE Rel. 8 to 12)," a "long TTI," a "normal subframe," a "long subframe," a "slot" and so on. A TTI that is shorter than a normal TTI may also be referred to as a "shortened TTI," a "short TTI," a "partial TTI (or a "fractional TTI"), a "shortened subframe," a "short subframe," a "mini slot," "a sub-slot," a "slot" and so on.

A long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain.

A RB may include one or more symbols in the time domain, and may be one slot, one mini slot, one subframe or one TTI in length. One TTI and one subframe each may be comprised of one or more resource blocks.

One or a plurality of RBs may be referred to as "physical resource block (physical RB (PRB))", "sub-carrier group (SCG)", "resource element group (REG)", "PRB pair", "RB pair" and so on.

A resource block may be composed of one or a plurality of resource elements (REs). For example, one RE may be a radio resource field of one subcarrier and one symbol.

The structures of radio frames, subframes, slots, mini slots, symbols and so on described above are merely examples. For example, configurations pertaining to the number of subframes included in a radio frame, the number of slots per a subframe or a radio frame, the number of mini slots included in a slot, the number of symbols and RBs included in a slot or a mini slot, the number of subcarriers included in an RB, the number of symbols in a TTI, the symbol duration, the length of cyclic prefixes (CPs), and the like can be variously changed.

The information and parameters described in the present disclosure may be represented in absolute values or in relative values with respect to given values, or may be represented using other applicable information. For example, a radio resource may be specified by a given index.

The names used for parameters and so on in the present disclosure are in no respect limiting. In addition, an equation and so on using these parameters may differ from those explicitly disclosed in the present disclosure. For example, since various channels (physical uplink control channel (PUCCH), physical downlink control channel (PDCCH), and so on) and information elements can be identified by any suitable names, the various names assigned to these individual channels and information elements are in no respect limiting.

The information, signals and/or others described in the present disclosure may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Information, signals and so on can be output in at least one of a direction from higher layers to lower layers and a direction from lower layers to higher layers. Information, signals and so on may be input and output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatuses.

The notifying of information is by no means limited to the aspects/embodiments described in the present disclosure, and may be performed using other methods. For example, the notifying of information may be implemented by physical layer signaling (for example, downlink control information (DCI), uplink control information (UCI)), higher layer signaling (for example, RRC (Radio Resource Control) signaling, broadcast information (master information block (MIB), system information block (SIB), and the like), and MAC (Medium Access Control) signaling), other signals or combinations of these.

Physical layer signaling may be referred to as "L1/L2 (Layer 1/Layer 2) control information (L1/L2 control signals)," "L1 control information (L1 control signal)" and so on. RRC signaling may be referred to as "RRC messages," and can be, for example, an RRC connection setup message, RRC connection reconfiguration message, and so on. MAC signaling may be reported using, for example, MAC control elements (MAC CEs).

Notifying of given information (for example, notifying of information to the effect that "X holds") does not necessarily have to be sent explicitly, and may be sent implicitly (for example, by not reporting this given information, or by notifying another information).

Decisions may be made in values represented by one bit (0 or 1), may be made in Boolean values that represent true or false, or may be made by comparing numerical values (for example, comparison with a given value).

Software, whether referred to as "software", "firmware", "middleware", "microcode", or "hardware description language", or called by other names, should be interpreted broadly, to mean instructions, instruction sets, codes, code segments, program codes, programs, subprograms, software modules, applications, software applications, software packages, routines, subroutines, objects, executable files, execution threads, procedures, functions, and the like.

Software, instructions, information, and the like may be transmitted and received via communication media. For example, when software is transmitted from a website, a server, or other remote sources by using at least one of wired technologies (coaxial cables, optical fiber cables, twisted-pair cables, digital subscriber lines (DSLs), and the like) and wireless technologies (infrared radiation, microwaves, and the like), at least one of these wired technologies and wireless technologies are also included in the definition of communication media.

The terms "system" and "network" as used in the present disclosure are used interchangeably.

In the present disclosure, the terms such as "precoding", "precoder", "weight (precoding weight)", "quasi-co-location (QCL)", "transmission configuration indication (TCI) state", "spatial relation", "spatial domain filter", "transmission power", "phase rotation", "antenna port", "antenna port group", "layer", "number of layers", "rank", "beam", "beam width", "beam angle", "antenna", "antenna element", "panel" can be used interchangeably.

In the present disclosure, the terms such as "base station (BS: Base Station)", "radio base station", "fixed station", "NodeB", "eNodeB (eNB)", "gNodeB (gNB)", "access point", "transmission point", "reception point", "transmission/reception point", "cell", "sector", "cell group", "carrier," "component carrier," and "bandwidth part (BWP)", may be used interchangeably. The base station may be called a term such as a macro cell, a small cell, a femto cell, a pico cell, and the like.

A base station can accommodate one or more (for example, three) cells (also referred to as "sectors"). When the base station accommodates a plurality of cells, the entire coverage area of the base station can be partitioned into a plurality of smaller areas, and each smaller area can provide the communication service through the base station subsystem (for example, indoor small base station (remote radio head (RRH))). The term "cell" or "sector" refers to all or part of the coverage area of at least one of a base station and a base station subsystem that provides communication services within this coverage.

As used in the present disclosure, the terms such as "mobile station (MS)," "user terminal," "user equipment (UE)", and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

At least one of a base station and a mobile station may be referred to as "transmitting apparatus," "receiving apparatus," "communication apparatus," or the like. At least one of the base station and the mobile station may be a device mounted on a mobile unit, a mobile unit itself, or the like. The mobile unit may be a vehicle (such as a car, an airplane, for example), an unmanned mobile unit (such as a drone, an autonomous vehicle, for example), or a robot (manned or unmanned). At least one of a base station and a mobile station includes apparatus that does not necessarily move during a communication operation. For example, at least one of the base station and the mobile station may be an IoT (Internet of Things) device such as a sensor.

The base stations in the present disclosure may be replaced by user terminals. For example, each aspect/embodiment of the present disclosure may be applied to a configuration in which communication between a base station and a user terminal is replaced by communication among a plurality of user terminals (which may be referred to as, for example, D2D (Device-to-Device), V2X (Vehicle-to-Everything) and so on). In this case, user terminals 20 may have the functions of the base stations 10 described above. In addition, the wording such as "up" and "down" may be replaced with the wording corresponding to the terminal-to-terminal communication (for example, "side"). For example, an uplink channel, a downlink channel and so on may be interpreted as a side channel.

Likewise, the user terminals in the present disclosure may be interpreted as base stations. In this case, the radio base stations 10 may have the functions of the user terminals 20 described above.

Certain actions that have been described in the present disclosure to be performed by base stations may, in some cases, be performed by their upper nodes. In a network including one or a plurality of network nodes with base stations, it is clear that various operations that are performed so as to communicate with terminals can be performed by base stations, one or more network nodes (for example, mobility management entities (MMEs), serving-gateways (S-GWs), and the like may be possible, but these are not limiting) other than base stations, or combinations of these.

The aspects/embodiments illustrated in the present disclosure may be used individually or in combinations, which may be switched depending on the mode of implementation. The order of processings, sequences, flowcharts and so on that have been used to describe the aspects/embodiments in the present disclosure may be re-ordered as long as inconsistencies do not arise. For example, although various methods have been illustrated in the present disclosure with various components of steps using exemplary orders, the specific orders that are illustrated herein are by no means limiting.

The aspects/embodiments illustrated in the present disclosure may be applied to long term evolution (LTE), LTE-advanced (LTE-A), LTE-beyond (LTE-B), SUPER 3G, IMT-Advanced, 4th generation mobile communication system (4G), 5th generation mobile communication system 5G), future radio access (FRA), new-radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), systems that use other adequate radio communication methods, and/or next generation systems that are enhanced based on these. Further, a plurality of systems may be combined and applied (for example, a combination of LTE or LTE-A and 5G).

The phrase "based on" as used in the present disclosure does not mean "based only on", unless otherwise specified. In other words, the phrase "based on" means both "based only on" and "based at least on."

Reference to elements with designations such as "first," "second" and so on as used in the present disclosure does not generally limit the number/quantity or order of these elements. These designations are used in the present disclosure only for convenience, as a method for distinguishing between two or more elements. In this way, reference to the first and second elements does not imply that only two elements may be employed, or that the first element must precede the second element in some way.

The term "determining" as used in the present disclosure may encompass a wide variety of actions. For example, to "judge" and "determine" as used herein may be interpreted to mean making judgments and determinations related to judging, calculating, computing, processing, deriving, investigating, looking up, search, inquiry (for example, searching a table, a database or some other data structure), ascertaining and so on.

Furthermore, to "judge (determine)" as used herein may be interpreted to mean making "judgment (determination)" related to receiving (for example, receiving information), transmitting (for example, transmitting information), inputting, outputting, accessing (for example, accessing data in a memory), and so on.

In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

"Judgment" and "determination" may be read as "assuming", "expecting", "considering" and so on.

The "maximum transmission power" described in the present disclosure may mean the maximum value of the transmission power, the nominal maximum transmission power (nominal UE maximum transmit power), or the rated maximum transmission power (rated UE maximum transmit power).

As used in the present disclosure, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access."

In the present disclosure, when two elements are connected to each other, these elements can be considered "connected" or "coupled" to each other by using one or more electrical wires, cables, printed electrical connections, and the like, and, as a number of non-limiting and non-inclusive examples, by using electromagnetic energy having wavelengths in a radio frequency domain, a microwave domain, an optical (both visible and invisible) domain, and the like.

In the present disclosure, the phrase "A and B are different" may mean "A and B are different from each other." The terms such as "leave" "coupled" and the like may be interpreted as well.

When terms such as "include," "including" and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, when articles, such as "a," "an," and "the" are added in English translation, the present disclosure may include the plural forms of nouns that follow these articles.

Now, although invention according to the present disclosure has been described above in detail, it is obvious to those skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description in the present disclosure is provided only for the purpose of explaining examples, and should by no means be construed to limit the invention according to the present disclosure in any way.

The invention claimed is:

1. A terminal comprising:
a receiver that receives a first physical downlink shared channel (PDSCH) scheduled by downlink control information (DCI);
a processor that determines, when a semi-static hybrid automatic repeat request acknowledgement (HARQ-ACK) codebook is configured, a codebook for a first physical uplink control channel (PUCCH) transmitted with repetitions per slot, based on at least one of a first PDSCH candidate occasion and information indicating a timing from reception of the first PDSCH to transmission of HARQ-ACK for the first PDSCH; and
a transmitter that transmits, on the first PUCCH, HARQ-ACK based on the codebook,
wherein when a period for repetitions of first PUCCH transmission collides with a period for transmission of an uplink control information (UCI) type which is different from the HARQ-ACK, the processor does not perform to transmit the UCI type and controls to transmit the first PUCCH.

2. The terminal according to claim 1, wherein the processor does not expect that a second PUCCH with HARQ-ACK for a second PDSCH, which is different from the first PDSCH, is scheduled in the period for repetitions of the first PUCCH transmission, and controls to transmit the first PUCCH.

3. The terminal according to claim 1, wherein a number of HARQ-ACK bits for the codebook is determined based on a configuration configured by higher layer signaling.

4. A radio communication method for terminal, comprising:
receiving a first physical downlink shared channel (PDSCH) scheduled by downlink control information (DCI);
determining, when a semi-static hybrid automatic repeat request acknowledgement (HARQ-ACK) codebook is configured, a codebook for a first physical uplink control channel (PUCCH) transmitted with repetitions per slot, based on at least one of a first PDSCH candidate occasion and information indicating a timing from reception of the first PDSCH to transmission of HARQ-ACK for the first PDSCH;
transmitting, on the first PUCCH, HARQ-ACK based on the codebook,
wherein when a period for repetitions of first PUCCH transmission collides with a period for transmission of an uplink control information (UCI) type which is different from the HARQ-ACK, transmission of the UCI type is not performed; and
controlling to transmit the first PUCCH.

5. A base station comprising:
a transmitter that transmits a first physical downlink shared channel (PDSCH) scheduled by downlink control information (DCI);
a processor that indicates, when a semi-static hybrid automatic repeat request acknowledgement (HARQ-ACK) codebook is configured, to determine a codebook for a first physical uplink control channel (PUCCH) transmitted with repetitions per slot, based on at least one of a first PDSCH candidate occasion and information indicating a timing from reception of the first PDSCH to transmission of HARQ-ACK for the first PDSCH; and
a receiver that receives HARQ-ACK based on the codebook, the HARQ-ACK being transmitted on the first PUCCH,
wherein when a period for repetitions of first PUCCH transmission collides with a period for transmission of an uplink control information (UCI) type which is different from the HARQ-ACK, the processor does not receive the UCI type and controls to receive the first PUCCH.

6. A system comprising a terminal and a base station, wherein:

the terminal comprises:
- a receiver that receives a first physical downlink shared channel (PDSCH) scheduled by downlink control information (DCI);
- a processor that determines, when a semi-static hybrid automatic repeat request acknowledgement (HARQ-ACK) codebook is configured, a codebook for a first physical uplink control channel (PUCCH) transmitted with repetitions per slot, based on at least one of a first PDSCH candidate occasion and information indicating a timing from reception of the first PDSCH to transmission of HARQ-ACK for the first PDSCH; and
- a transmitter that transmits, on the first PUCCH, HARQ-ACK based on the codebook,
- wherein when a period for repetitions of first PUCCH transmission collides with a period for transmission of an uplink control information (UCI) type which is different from the HARQ-ACK, the processor does not perform to transmit the UCI type and controls to transmit the first PUCCH; and the base station comprises:
- a transmitter that transmits the first PDSCH;
- a processor that indicates, when the semi-static HARQ-ACK codebook is configured, to determine the codebook, based on at least one of the first PDSCH candidate occasion and the information indicating the timing; and
- a receiver that receives the HARQ-ACK,
- wherein when the period for repetitions of the first PUCCH transmission collides with the period for transmission of the UCI type, the processor does not receive the UCI type and controls to receive the first PUCCH.

* * * * *